United States Patent
Kitamura et al.

(10) Patent No.: US 6,853,482 B1
(45) Date of Patent: Feb. 8, 2005

(54) MICROSCOPE

(76) Inventors: Jun Kitamura, 2047-602, Shimotsurma, Yamato-shi, Kanagawa 242-0001 (JP); Kiyoshi Saitoh, 18-1-804, Shimokurata-cho, Totsuka-ku, Yokohama-shi, Kanagawa 244-0815 (JP)

( * ) Notice: Subject to any disclaimer, the term of this patent is extended or adjusted under 35 U.S.C. 154(b) by 0 days.

(21) Appl. No.: 09/582,094
(22) PCT Filed: Feb. 3, 2000
(86) PCT No.: PCT/JP00/00591
§ 371 (c)(1),
(2), (4) Date: Jun. 22, 2000

(30) Foreign Application Priority Data

Feb. 4, 1999 (JP) .......................... 11-000475
Jun. 14, 1999 (JP) .......................... 11-004275
Oct. 13, 1999 (JP) .......................... 11-291266

(51) Int. Cl.[7] .......................... G02B 21/06; G02B 21/00
(52) U.S. Cl. .......................... 359/390; 359/368; 359/385
(58) Field of Search .......................... 359/368–390, 359/431, 871–872, 838; 600/170–176, 121, 129; 351/220–227

(56) References Cited

U.S. PATENT DOCUMENTS

| 2,102,274 A | * | 12/1937 | Larimore | 600/176 |
|---|---|---|---|---|
| 3,548,808 A | * | 12/1970 | Nagashige et al. | 600/173 |
| 3,857,626 A | * | 12/1974 | Rosenberger et al. | 359/387 |
| 4,671,630 A | * | 6/1987 | Takahashi | 359/503 |
| 4,830,483 A | * | 5/1989 | Kohayakawa et al. | 351/221 |
| 5,791,345 A | * | 8/1998 | Ishihara et al. | 128/637 |
| 6,190,309 B1 | * | 2/2001 | Ooshima et al. | 600/179 |
| 6,424,461 B1 | * | 7/2002 | Kajiro | 359/385 |

FOREIGN PATENT DOCUMENTS

| JP | 6-30412 | * | 2/1994 | 359/363 |

* cited by examiner

Primary Examiner—Thong Q Nguyen
(74) Attorney, Agent, or Firm—Westerman, Hattori, Daniels & Adrian, LLP

(57) ABSTRACT

The microscope (S, 100) of the present invention has a hand piece (20, 112), whose tip is mounted with a thin sheet-like mirror unit (M, 10, 130, 220), and around both ends of the base (11c, 131c) thereof is arranged an illuminating light source (32, 117), whereby light is emitted to a target object, image light is lead through the light reception bore (27, 116), to the optical system (114), and is recorded at the CCD camera (111), to obtain video images. The thin sheet-like mirror (M, 11, 131) confines light and navigate it, wherein the width of the mirror can be made narrower like a convergent taper surface (11a, 131a); and it is comprised of a base surface (11c, 131c) where illuminating light comes in and image light goes out, and a mirror surface (11b, 131b) where illuminating light and image light go back and forth, and make the reflection thereof, and the mirror surface (11b, 131b) is slanted to 45 degrees. The microscope may be used as a handy microscope if it is not equipped with a charge-coupled device camera. The microscope can provide a wider horizon, which makes it possible to make a horizontal observation in an extremely narrow space, and can be manufactured at a less expensive price.

6 Claims, 24 Drawing Sheets

PRIOR ART

MICROSCOPE

TECHNICAL FIELD

The present invention relates to a microscope utilized as a probe for observing an extremely small portion or a microscopic construction of an object; for example, conditions of the BGA (Ball Grid Array), skin, etc. can be observed or examined.

BACKGROUND TECHNOLOGIES

When observing constructions of the skin, conditions of the hair, etc., hand-held microscopes have been frequently used in the fields of medicine, cosmetics, etc. recently, as well as applications of such microscopes have been under development in the field of the manufacturing industry for various machines, and electric and electronic products, or machines, electronic and electric parts to be used therewith.

Among them, when illustrating an example in the case of an ultra-small package BGA soldering, the BGA of this type has come to be more and more frequently used in a wide variety of utilities, such as LSI's in mobile phones, digital camera built-is VTR's, high-performance microprocessors in mobile information terminals. Now, in attaching the BGA to the board, soldering balls of the BGA are soldered onto the board under a predetermined temperature, and in order to achieve the optimal attachment, it is necessary to determine the appropriate temperature by examining the soldering conditions.

However, as means for observing and examining how adequately the soldering balls of the BGA are reliably attached to the board, there are the examinations by electricity transmission and X-ray transmission; nonetheless, the reality is that the associated therewith cost turns out to be extremely high.

At the same time, the soldering balls of the BGA are extremely microscopic as their diameter ranges somewhere between hundreds of microns and one millimeter, the conventional visual observation means, for example, the means using a mirror, etc., cannot fully reveal the soldering conditions.

FIG. 24 is a schematic diagram, showing a conventional example in observing the soldering conditions; where (a) is an observation example by a mirror whereas (b) is an observation example by a prism. It shall be noted that the arrows in the diagrams signify illuminating light.

As shown in FIG. 24(a), by the conventional examination using the mirror 1, when observing the soldering conditions of the soldering ball 4 of the BGA 3 soldered onto the board 2, the conventional mirror 1 makes it hard to observe the bottom part, where the soldering ball is attached to the board 2 because of the thickness 5 of the mirror; moreover, the depth 6 of the mirror is huge, so the usage in extremely narrow portions is difficult.

Likewise as shown in FIG. 24(b), the conventional examination using a prism 7, the bottom of the part, where the soldering ball 4 is attached to the board 2 can be observed; however, the dimension 8 of the prism itself is formed so that its width becomes rather wide, so the usage in extremely narrow portions is difficult.

Furthermore, with the conventional microscope, when visually observing, for example, the human skin, or the hairline, regions that come in sight are small, and clear images are hard to obtain, which has left a room for further improvements.

Given the situation, one of the objectives of the present invention is to provide a wider horizon, which makes it possible to make a horizontal observation in an extremely narrow space, and can be manufacturerd at a less expensive price.

Moreover, another objective of the present invention is to provide a charge-coupled device-type video microscope that is suitable for a video observation by incorporating a lighting device into the body of such a microscope in order to irradiate illuminating light efficiently, and preferably by incorporating a charge-coupled device camera.

SUMMARY OF THE INVENTION

In order to achieve the above-mentioned objectives, according to one embodiment of a microscope based on the present invention, there are provided a thin sheet-like mirror, and a mirror surface formed at the tip of this thin sheet-like mirror at an acute angle; and more preferably, the thin sheet-like mirror is formed in such a way that the width becomes narrower and narrower toward the tip end thereof.

The tip end of the above-mentioned thin sheet-like mirror is preferably formed like a taper, i.e., convergent, and further preferably the top portion thereof is to be supported by a support bar.

The above-mentioned thin sheet-like mirror is preferably constructed in a single unit with the support bar.

The above-mentioned support bar can be detached from and rotated around a hand piece, and preferably has a fastening device to fix the support bar at a predetermined angle.

According to another embodiment of a microscope of the present invention, it is characterized in that the microscope has a means of light emission and reception for illuminating light and image light, a thin sheet-like mirror arranged at the means of light emission and reception, the tip end of this thin sheet-like mirror being formed so that its width becomes narrower and narrower toward the tip, and a mirror surface that is formed at the tip of the mirror at an acute angle.

Moreover, according to yet another embodiment of a microscope of the present invention, there are provided: a means of light emission and reception, comprised of a straight-through bore having a built-in source of illuminating light, and a light reception bore for image light separately; and a thin sheet-like mirror, arranged in a closed and adjacent manner with the straight-through bore and the light reception bore of this means of light emission and reception, wherein the width of the tip end of this thin sheet-like mirror is formed to become narrower, the mirror surface is formed at an acute angle at the tip thereof, the thin sheet-like mirror navigates illuminating light so as to reflect and irradiate the light, and the thus reflected and returned image light can be navigated by making a reflection at the above-mentioned mirror surface.

Furthermore, according to further yet another embodiment of the present invention, a charge-coupled device-type video microscope may be comprised of: a means of light emission and reception, comprised of a straight-through bore having a built-in source of the compact charge-coupled device camera's illuminating light, and a light reception bore for image light separately; and a thin sheet-like mirror, arranged in a closed and adjacent manner with the straight-through bore and the light reception bore of this means of light emission and reception, wherein the width of the tip end of this thin sheet-like mirror is formed to become narrower, the mirror surface is formed at an acute angle at the tip thereof, the thin sheet-like mirror navigates illuminating light so as to reflect and irradiate the light, and the thus reflected and returned image light can be navigated by making a reflection at the above-mentioned mirror surface. Additionally, the above-mentioned microscope may be simply used as a loupe by combining the magnifying lens and the above-mentioned thin sheet-like mirror.

The said thin sheet-like mirror need not to be formed so that the width of the tip end becomes narrower; instead, the overall shape may be rectangular. Moreover, this thin sheet-like mirror may be separately formed in accordance with the above-mentioned straight-through bore and the light reception bore. Furthermore, this thin sheet-like mirror may have a half mirror, whose base side takes in illuminating light and irradiates image light.

Additionally, the thin sheet-like mirror may be constructed in such a manner; that it has a half mirror, whose base side takes in the above-mentioned illuminating light and irradiates the above-mentioned image light; that the above-mentioned straight-through bore and the above-mentioned light reception bore have polarization plates, having different polarizing angles; that the thin sheet-like mirror reflects the polarized illuminating light at the half mirror to irradiate the navigated light; and that the thus reflected and returned image light can be navigated and polarized at the mirror surface to get the light condensed. Furthermore, the thin sheet-like mirror may be arranged in the form of the separate type in accordance with the means of light emission and reception.

The thus constructed microscope of the present invention has a thin sheet-like mirror with a mirror surface formed at an acute angle, so the target object can be vertically examined, while providing a wide horizon, wherein a horizontal observation can be made even in an extremely narrow space.

In addition, if the thin sheet-like mirror is formed particularly in a convergent taper-like shape, the lighting efficiency will be improved, and at the same time, it is possible to observe a hard-to-observe target object due to its physical space, etc. effectively and appropriately.

The present microscope can be used as a loupe by combining a thin sheet-like mirror, which is formed at an acute angle at the tip, and a magnifying glass; in addition, by incorporating a compact charge-coupled device camera, and by recording dynamic visual image therewith, it can be utilized as a charge-coupled device-type video microscope, wherein clear video images of the target object of the observation can be obtained.

In addition, by allowing the thin sheet-like mirror to be detached from and rotated around the hand piece, an easy construction will make it possible that an integrated unit be obtained, and that the gradient of the thin sheet-like mirror to the hand piece can be made variable.

The thus constructed microscope of the present invention can ensure flare-free image light since the thin sheet-like mirror confines light, and this in turn navigates illuminating light and image light to get them reflected at the mirror surface, which results in diffused light.

BRIEF DESCRIPTION OF THE DRAWINGS

The present invention will be understood more fully from the detailed description given here below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Well-applied forms of the present invention are shown in the following, with occasional references being made to the attached drawings.

Figure 1:
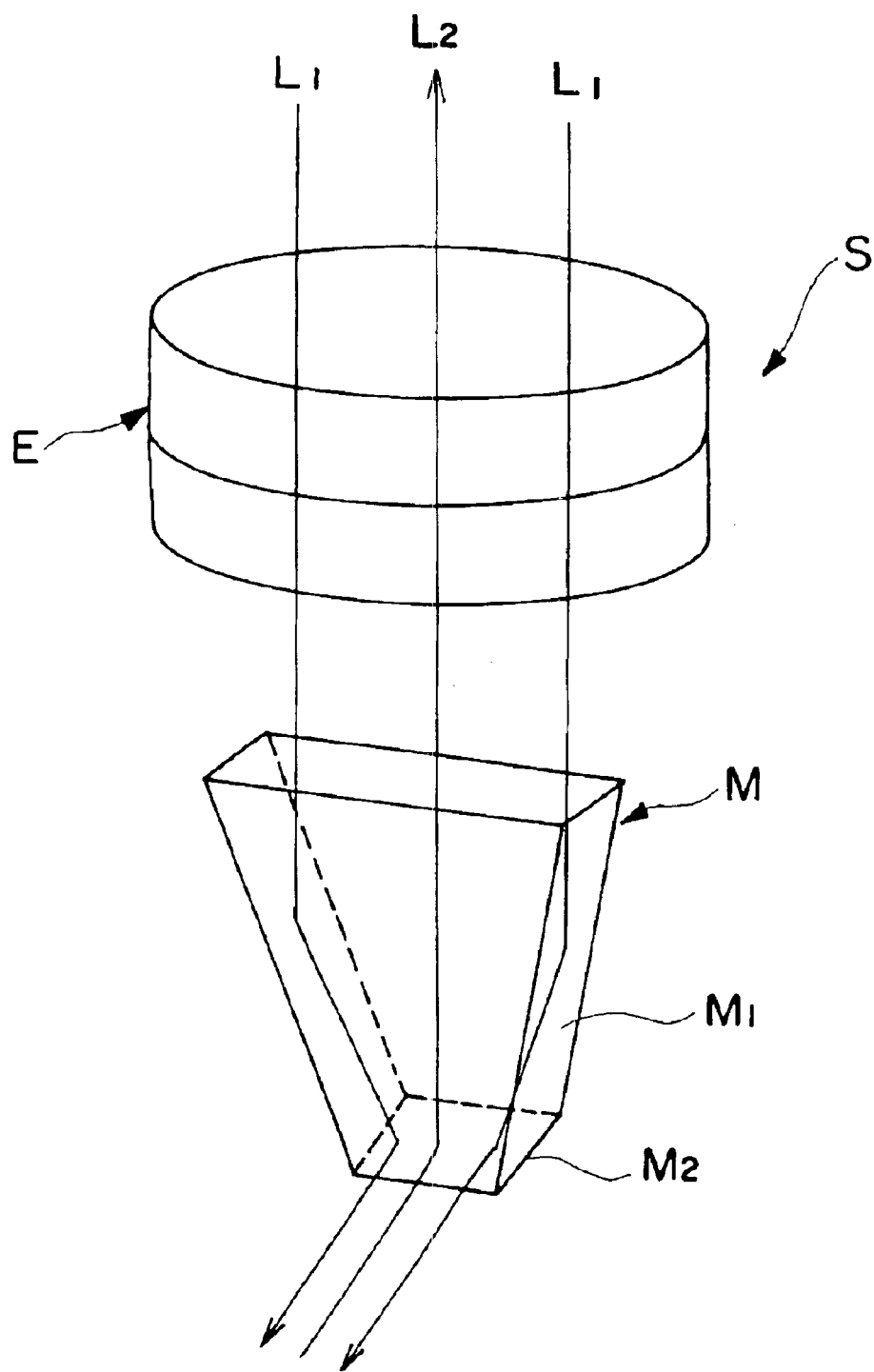
FIG. 1 is a principle structural diagram showing the placement relationships between the optical system relevant to the present invention and the thin sheet-like mirror that is formed like a convergent taper.

The first embodiment of the present invention is a case where a microscope is used as a loupe, and FIG. 1 is a perspective view showing a principle structure of such a microscope, i.e., a loupe.

Namely, this microscope S is basically comprised of a magnifying lens E, and a thin sheet-like mirror M, wherein the thin sheet-like mirror M is constructed in such a way that the width of the tip end thereof becomes narrower, and is preferably formed as a convergent taper surface M1, and at the tip thereof there is provided a mirror surface M2 cut out at an acute angle.

In FIG. 1, when making an observation from an eye lens that is not included in the figure by placing a target object near the mirror surface M2 of the microscope S, and put a loupe in an upright position, and through the mirror surface M2, the reflected image of the target object can be shown as a magnified image.

Figure 2:
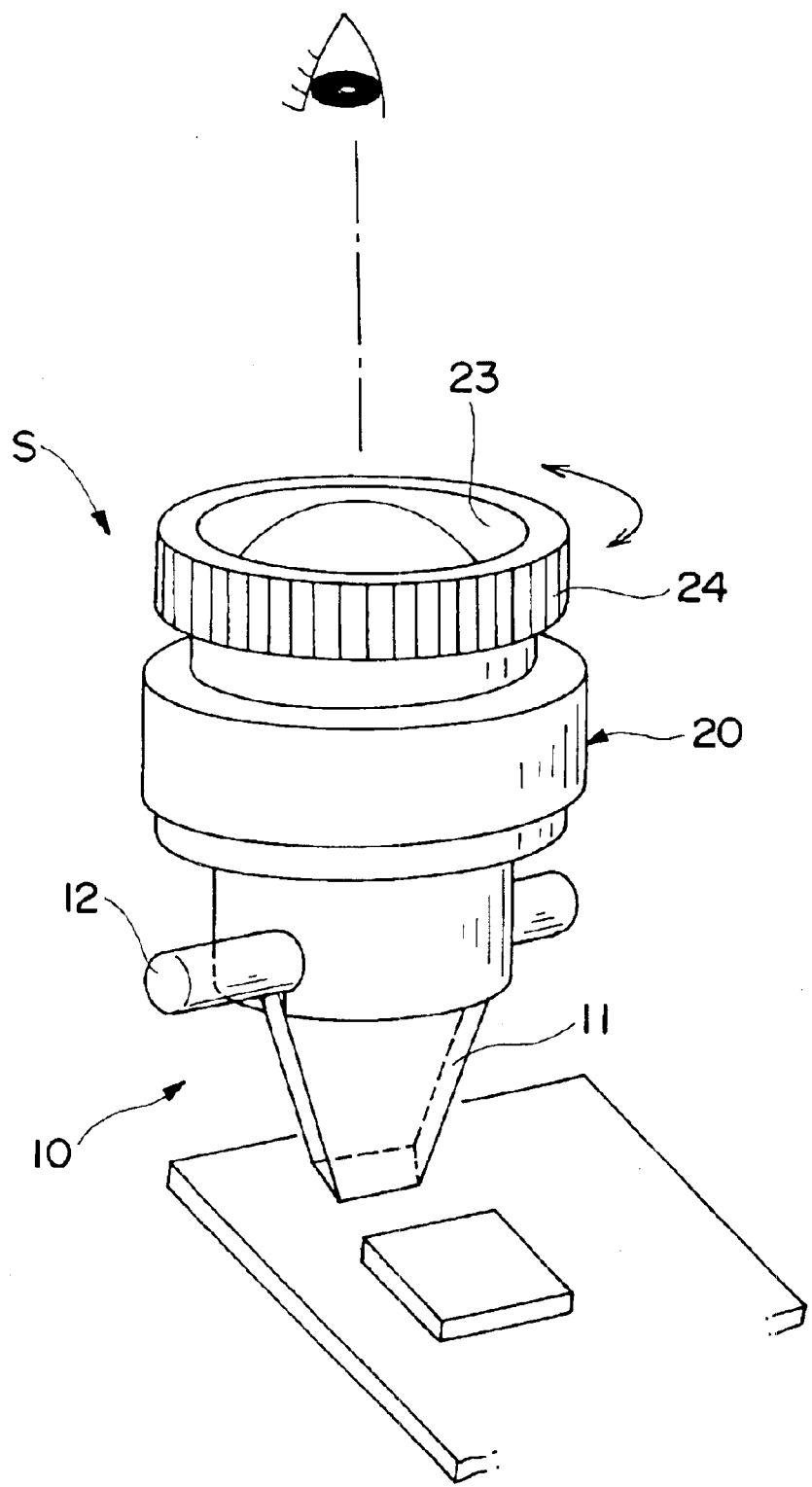
FIG. 2 is a perspective view showing an example where a microscope based on the first embodiment of the present invention is used as a loupe.
Figure 3:
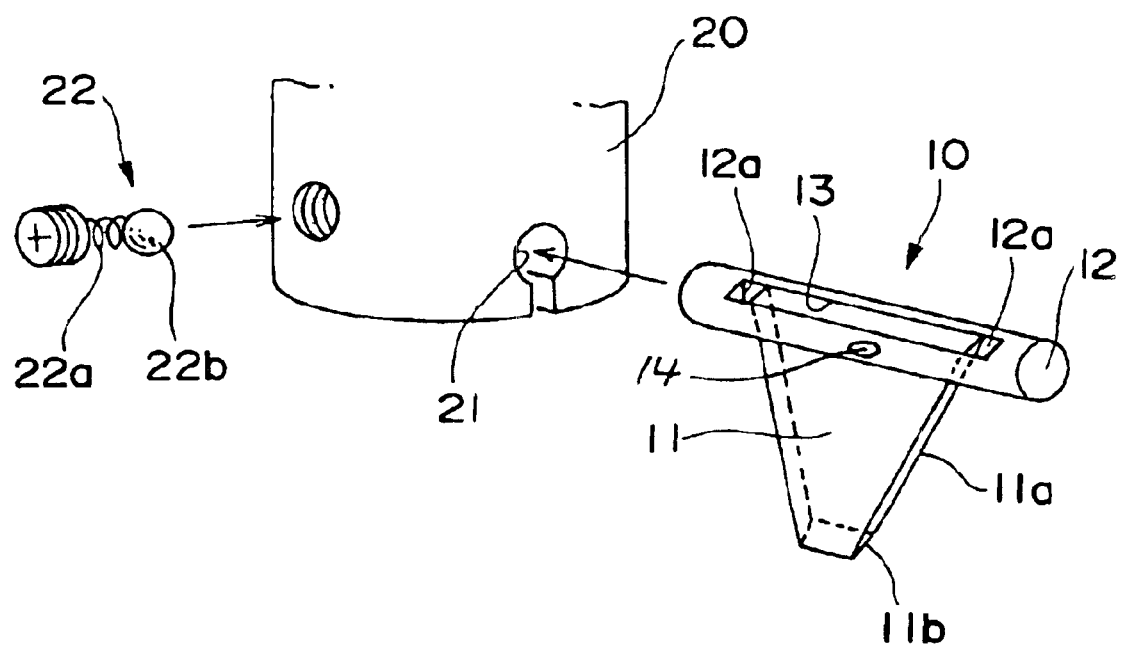
FIG. 3 is a perspective view showing a mounting means of the thin sheet-like mirror unit of the above-mentioned embodiment to a hand piece.

FIGS. 2 and 3 show application examples when the microscope is used as a loupe. The thin sheet-like mirror 11 mounted at the tip of this loupe is constructed as a thin sheet-like mirror unit 10, which is integrated in the support bar 12 by embedding its base (i.e., its topside) to the long slot 13 that pierces the support bar 12. The above-mentioned thin sheet-like mirror 11 is formed so that its width becomes narrower; that is, in a typical case having an acute angle of 45 degrees of the mirror surface 11b, it is formed as having a convergent taper surface 11a from its base side width 12 mm to the tip width approximately 4 mm.

The microscope S is constructed so that the tip portion of its hand piece 20 as a whole has a cut-out groove 21, which the support bar 12 of the thin sheet-like mirror unit 10 can be slid in and attached thereto, whereby the thin sheet-like mirror unit 10 is detachable from the hand piece 20, thus providing the ability of replacement of the unit. Additionally, inside the hand piece 20, a magnifying lens E is placed, and to an eye lens 23 of the hand piece 20, a focus adjustment ring 24 for the focus adjustment purpose is attached.

Now, by making a slide-attachment of the support bar 12 of the thin sheet-like mirror unit 10 into the hand piece 20 through the insertion via the cut-out groove 21, as shown in FIG. 3, by the ball plunger 22 that can stick out from the cut-out groove 21, the thin sheet-like mirror unit 10 gets its center positioned, and fixed. In this case, by providing in advance a concave positioning groove 14 at the center of the support bar 12 of the thin sheet-like mirror unit 10, and by linking the ball 22b pushed out by the spring 22a of the ball plunger 22 and this positioning groove 14, the thin sheet-like mirror unit 10 can be appropriately positioned at the hand piece 20.

Figure 4:
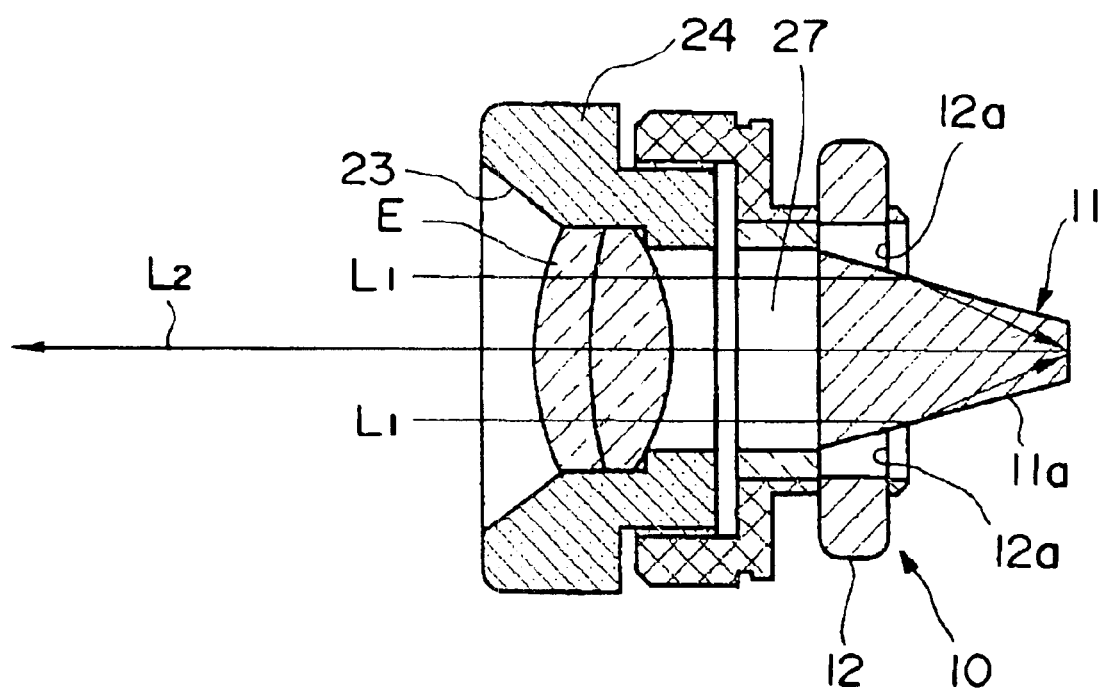
FIG. 4 is a vertical cross-sectional view of the microscope (loupe) based on the above-mentioned first embodiment, which is viewed from the front thereof.
Figure 5:
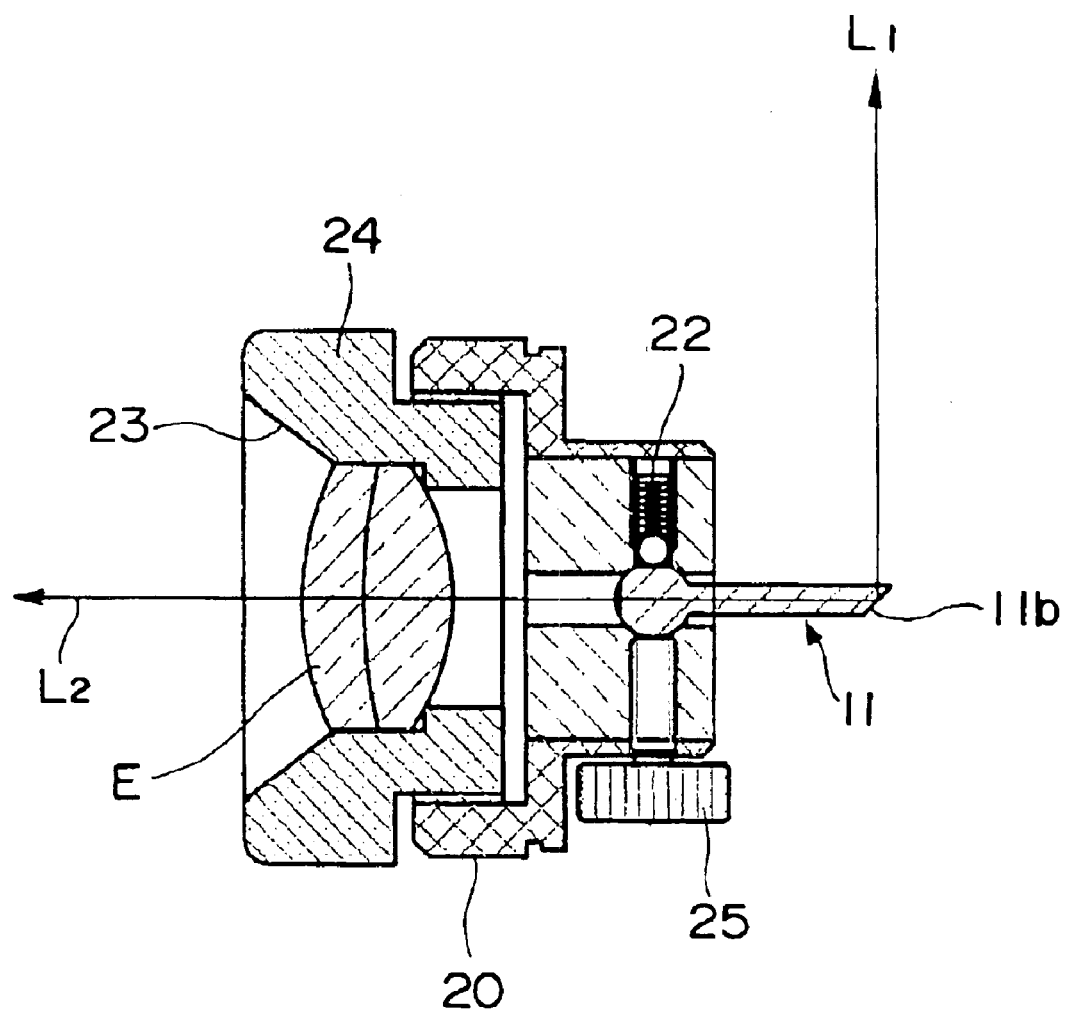
FIG. 5 is a vertical cross-sectional view of the microscope (loupe) based on the above-mentioned first embodiment, which is viewed from the side thereof.
Figure 6:
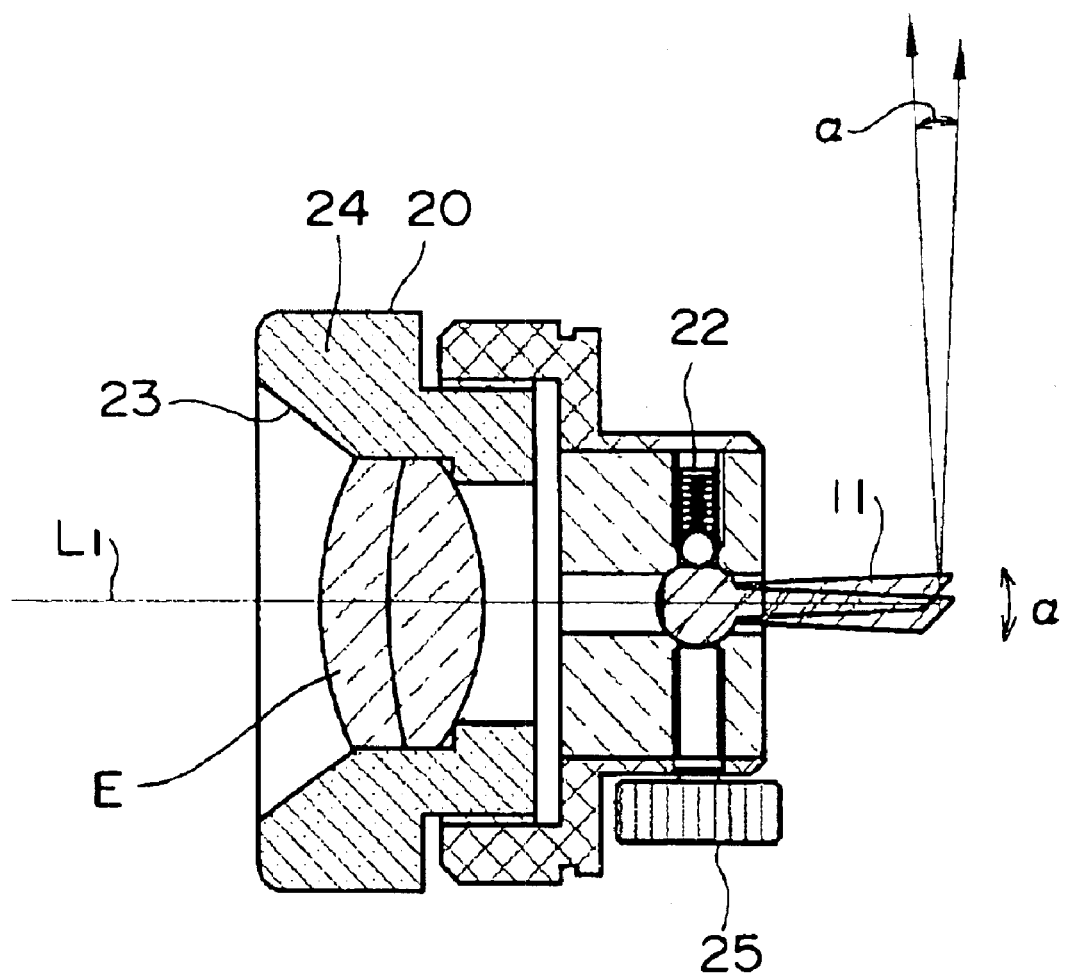
FIG. 6 is a vertical cross-sectional view illustrating the angle adjustment mechanism of the thin sheet-like mirror unit of the microscope (loupe) based on the above-mentioned first embodiment.

FIGS. 4 to 6 are vertical cross-sectional views, each of which can be obtained by rotating the state in FIG. 2 by 90 degrees. As a source of illuminating light, this microscope utilizes the natural light, and as shown in FIG. 4, light L1 for the illumination purpose, incident from the eye lens 23, goes straight to the taper surface 11a of the thin sheet-like mirror surface 11, gets reflected, concentrates at the mirror surface 11b that has been formed to make an acute angle, and emits light to illuminate the target object efficiently. The illuminated image light L2 in turn goes through the mirror surface 11b again, and via the lens E, reaches the eye lens 23, wherein a target object can be brought into focus by the focus adjustment ring 24, and the target object can be observed in a magnified view.

As shown in FIG. 5, the support bar 12 of the thin sheet-like mirror unit 10 is inserted and fixed to the cut-out groove 21 of the hand piece 20 by a fastening device, for example, a prism angle maintaining screw 25 that is helically attached to the tip of the hand piece 20. And the support bar 12 of the thin sheet-like mirror unit 10 is, as shown in FIG. 6, capable of rotating within an appropriate range α by this prism angle maintaining screw 25, whereby the gradient of the mirror surface 11b to the hand piece 20 can be variable so that the range of observation angle can be greatly extended; all of which provides effective observations by the thin sheet-like mirror unit 10 even in a narrow space or a hard-to-observe location, and observations with the target object being brought into focus even when the location of the target object is not proper, and/or inappropriate or secluded.

Figure 7:
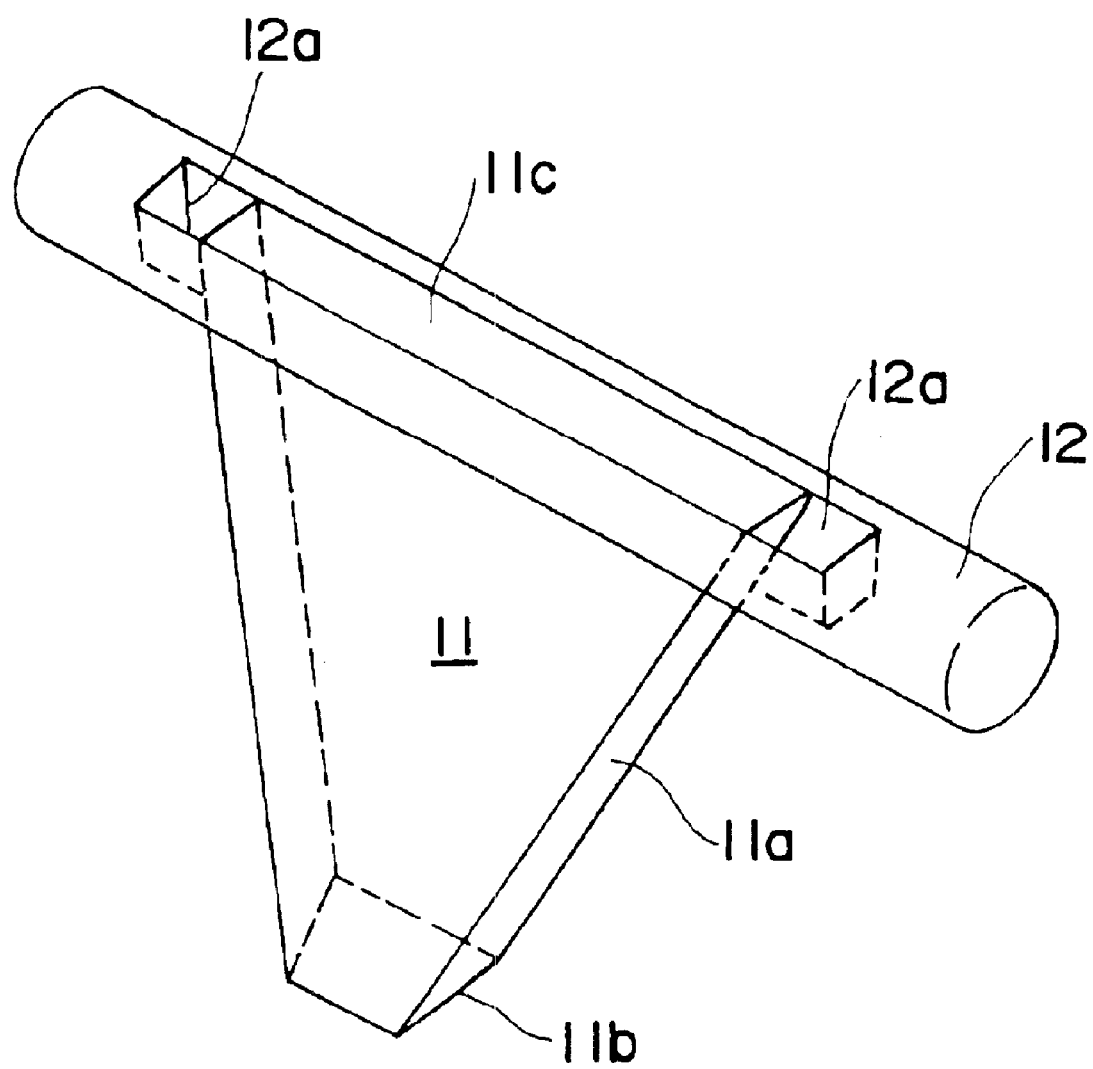
FIG. 7 is a perspective view showing the construction of the thin sheet-like mirror unit of the microscope (loupe) based on the above-mentioned first embodiment.

FIG. 7 is a perspective view of the thin sheet-like mirror unit of the microscope based on the above-mentioned embodiment, wherein the thin sheet-like mirror 11 and the support bar 12 are formed as a unit and are made from, for example, glass or hard plastic materials, or other synthetic resin materials.

In this case, in order to avoid refraction, etc. of illuminating light and image light, the top center part of the support bar 12, that is, the base surface 11c of the thin sheet-like mirror 11, is formed as a flat surface, and both ends of this base surface 11c forms spaces 12a between the support bar 12 and itself so that illuminating light can be efficiently condensed without letting it diffuse from the ends. And the taper surface 11a of the thin sheet-like mirror 11 is formed to be convergent from its base surface 11c toward the mirror surface 11b at the tip, which improves condense efficacy. By these arrangements, it is possible for light from a means of light emission and reception to efficiently emit light from the thin sheet-like mirror 11, and for received light from a target object to be lead to the means of light emission and reception efficiently.

By constructing the thin sheet-like mirror unit 10 as the above, it is possible to be formed as a single unit by synthetic resins, etc., which provides stable accuracy and less expensive manufacturing cost.

Incidentally, though drawings are omitted, instead of the thin sheet-like mirror unit 10 being constructed as a unit construction illustrated in the above, it may be separately constructed; wherein the support bar 12 is made from nontransparent materials such as metals or plastic, and prepares a straight-through bore in the center, and the base surface 11c of the thin sheet-like mirror 11, which is formed by transparent materials such as glass or acrylic resins, is inserted to this straight-through bore and attached thereto. In cases where both members are separately constructed, high accuracy in attaching both members is required; however, there may be an advantage of reducing loss of light.

Figure 8:
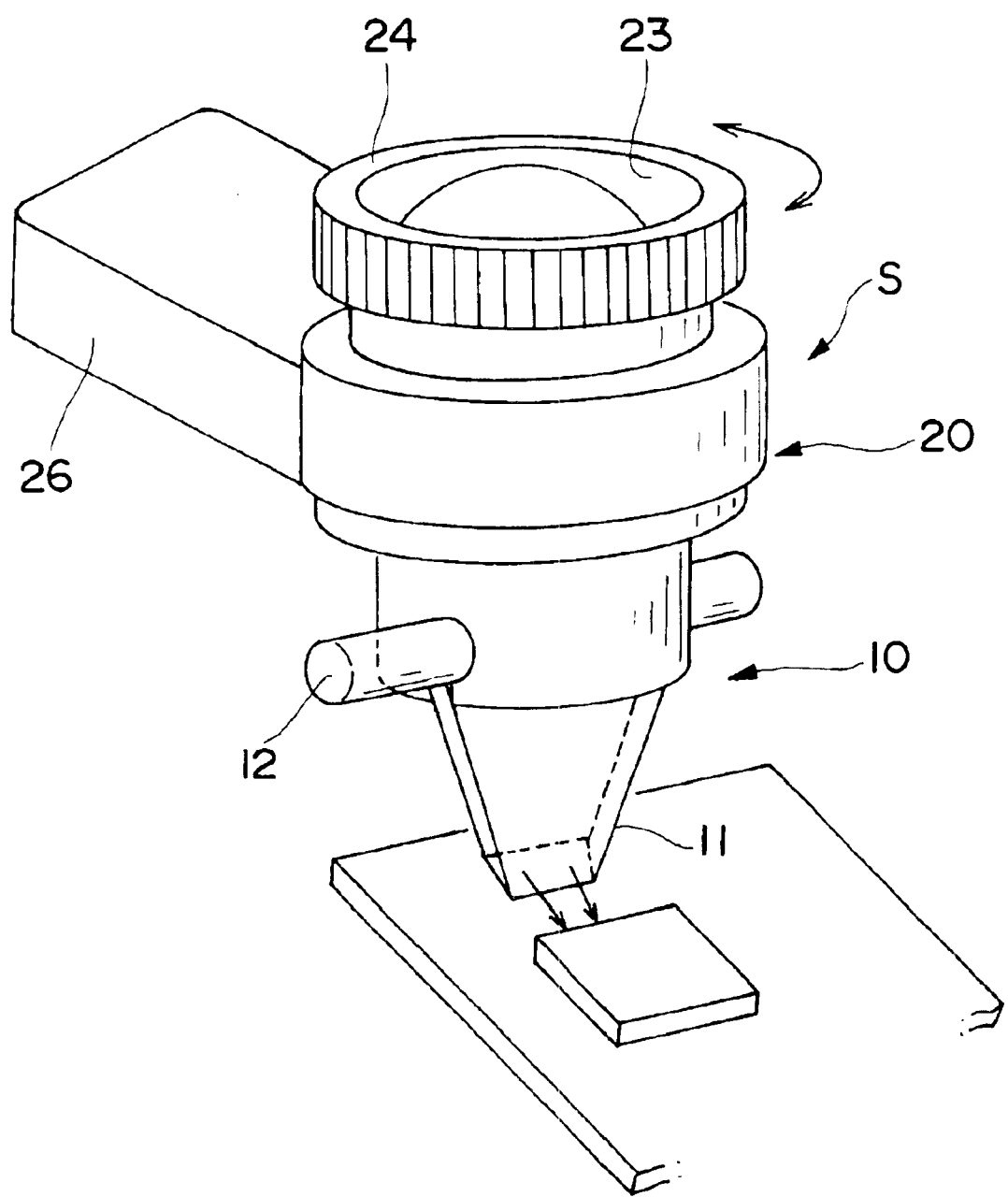
FIG. 8 is a perspective view of a lighting device built-in microscope that is based on the second embodiment of the present invention.
Figure 9:
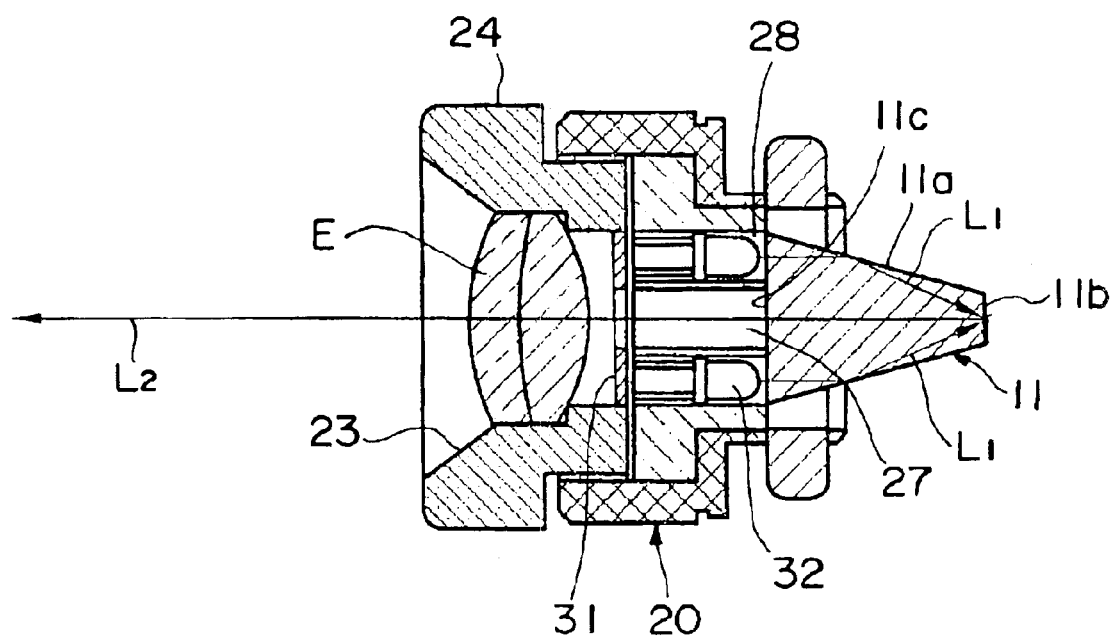
FIG. 9 is a vertical cross-sectional view of a lighting device built-in microscope based on the above-mentioned second embodiment, which is viewed from the front thereof.
Figure 10:
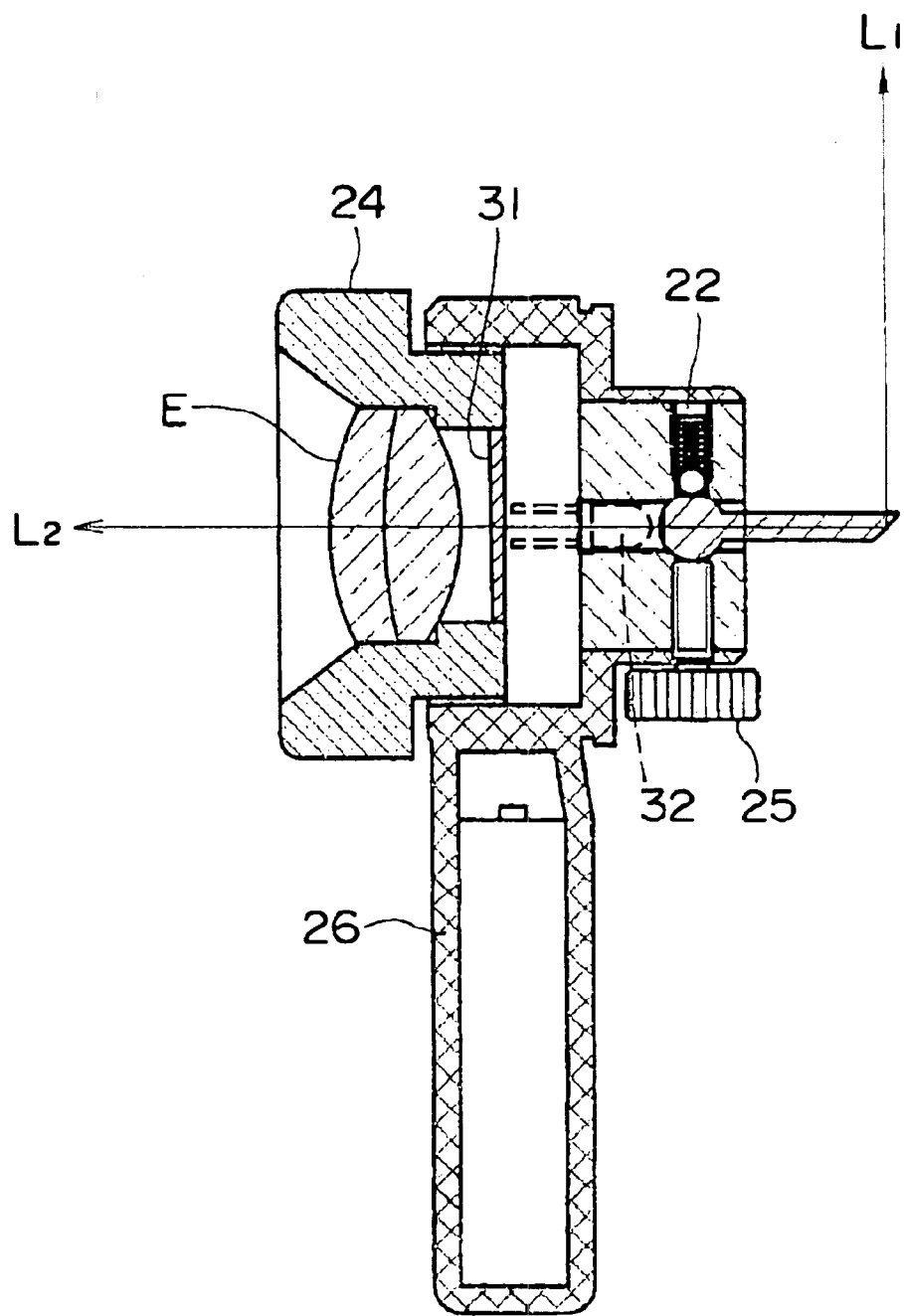
FIG. 10 is a vertical cross-sectional view of a lighting device built-in microscope based on the above-mentioned second embodiment, which is viewed from the side thereof.

FIGS. 8 to 10 show the embodiment of a microscope with a lighting device, where a lighting device is incorporated into the hand piece of the microscope. According to this second embodiment, by incorporating a lighting device into the microscope, a target object can be clearly illuminated so that clear images can be obtained.

In FIG. 8, a battery box 26 housing batteries sticks out horizontally from the hand piece 20, and inside the hand piece 20, as shown in FIGS. 9 and 10, a printed board for source light 31, and lamps for the illumination purpose 32 and 32 that are comprised of, for example, two light emitting elements mounted on the printed board as a each parallel, are built in Each of the lamps for the illumination purpose 32 and 32 are inserted to straight-through bores 28 and 28 that are formed for the illumination purpose inside the hand piece 20, and arranged in an opposing location adjacent to each end region of the base surface 11c of the thin sheet-like mirror 11. Moreover, at the center part inside this hand piece 20, a light reception bore 27 for images are formed in such a way that it extends from the center of the base surface 11c of the thin sheet-like mirror 11 toward the optical system E.

Additionally, if the above-mentioned battery box 26 is formed to serve as a holding portion simultaneously when the microscope is in use, it provides an advantage.

When the microscope of the present embodiment is used, a switch, which is not included in the drawings, allows the batteries inside the battery box 26 to supply electricity, which in turn allows light emitting diodes as the lamps for the illumination purpose 32 and 32 to emit light, then as shown in FIG. 9, the illuminating light L1 is irradiated. The irradiated illuminating light L1 is taken in from both ends of the thin sheet-like mirror 11, gets reflected at the taper surface 11a, gets condensed at the mirror surface 11b at the tip, and illuminates a target object efficiently. The illuminated image light L2 moves through the mirror surface 11b again, passes through the light reception bore for images 27 of the hand piece 20, and via the lens E, reaches the eye lens 23, and by making an adjustment of the focus adjustment ring 24, magnified target object can be observed.

According to the microscope of the present embodiment, the lamps for the illumination purpose 32 and 32 directly cast light the target object, extremely clear images can be observed, and in particular, this is effective in observations in high magnification or in the dark places.

In the embodiment shown in FIG. 9, since the light emitting diodes as the lamps for the illumination purpose 32 and 32 are arranged vertically in a parallel alignment inside the hand piece 20, the diameter of the hand piece 20 can be made smaller.

Figure 11:
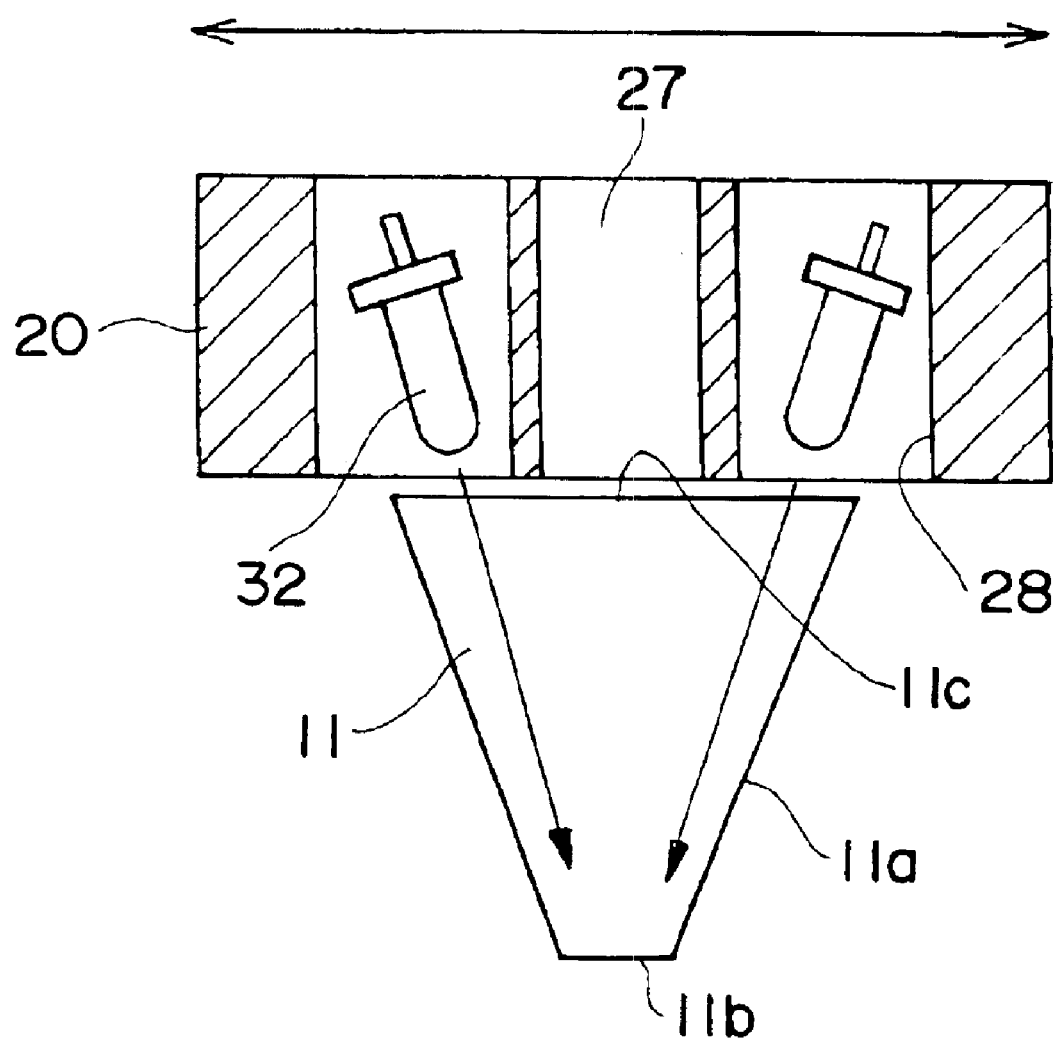
FIG. 11 is a cross-sectional view of a transformation example of a lighting device built-in microscope based on the above-mentioned second embodiment.

Instead, as shown in FIG. 11, the lamps for the illumination purpose 32 and 32 may be arranged slantwise along the taper surface 11a of the thin sheet-like mirror 11. In this case, most of the illuminating light can be directly irradiated toward the target object, loss of the light volume will be less; however, compared with that of the vertical alignment, the diameter of the hand piece 20 becomes relatively large.

Figure 12:
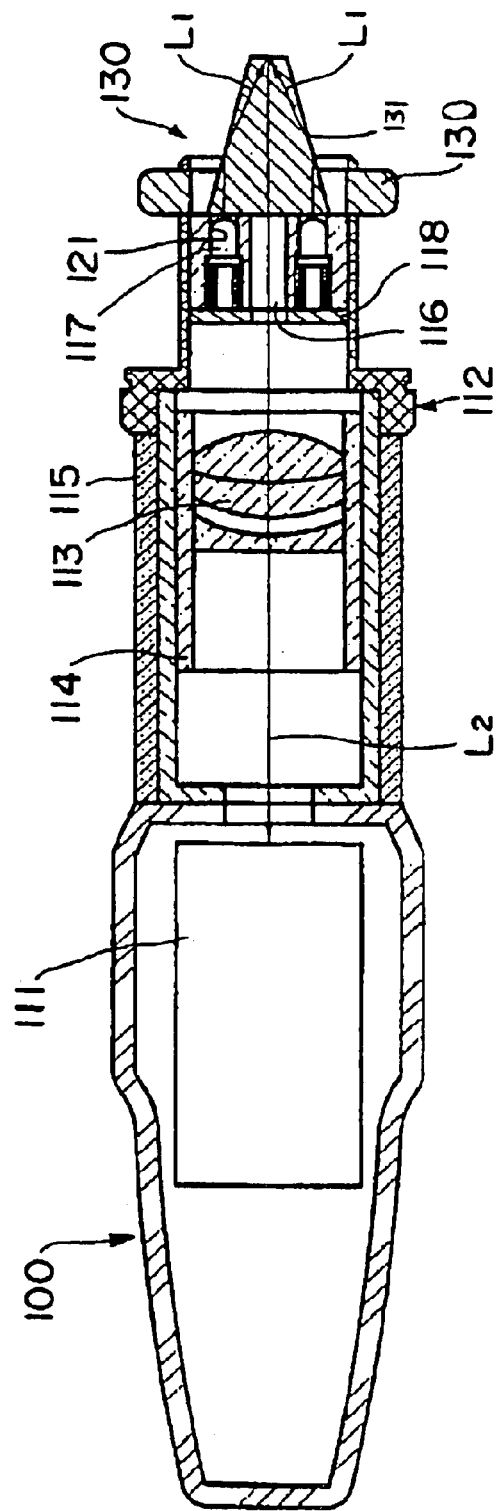
FIG. 12 is a vertical cross-sectional view of a charge-coupled device-type video microscope that is based on the third embodiment of the present invention, which is viewed from the front thereof.
Figure 13:
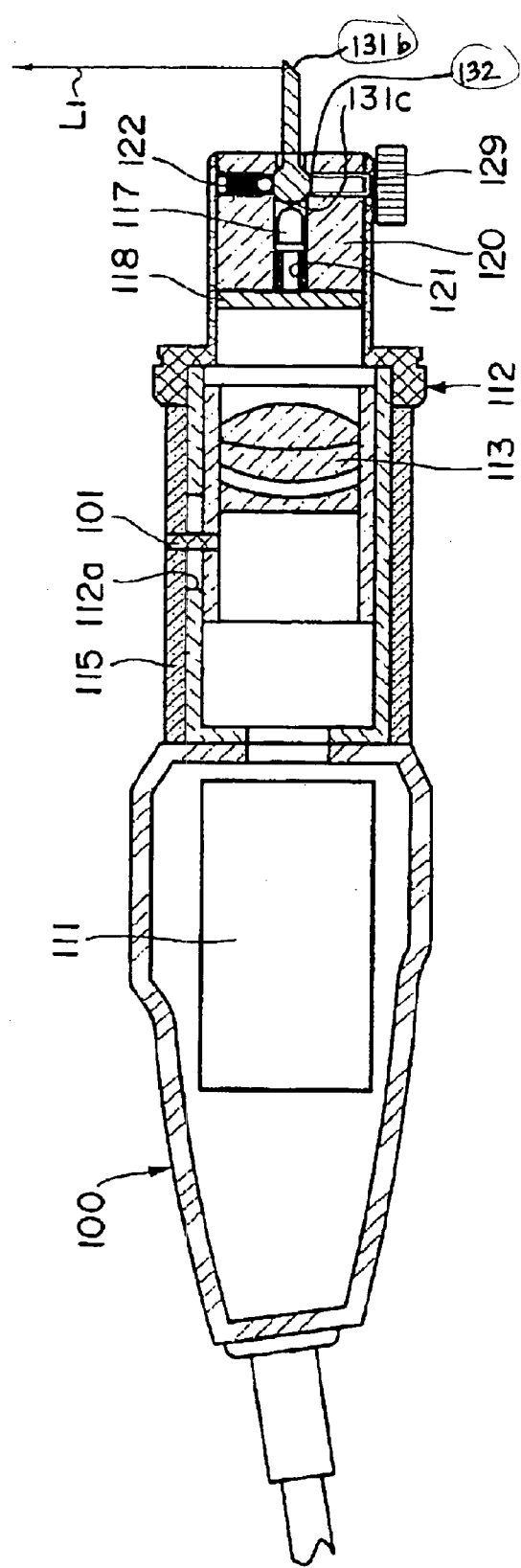
FIG. 13 is a vertical cross-sectional view of the charge-coupled device-type video microscope in FIG. 12, which is viewed from the side thereof.

Next, the third embodiment of the present invention will be illustrated with referring to FIGS. 12 and 13.

The third embodiment aims at obtaining video images as a charge-coupled device-type video microscope, by incorporating a compact charge-coupled device camera into the microscope.

FIG. 12 is a schematic cross-sectional view of this charge-coupled device-type video microscope, which is viewed from the front thereof, and FIG. 13 is a schematic cross-sectional view seen from the side thereof.

This charge-coupled device-type video microscope 100 is comprised of: an optical system 114 that appropriately combines a charge-coupled device (CCD) 111 and a plurality of lenses 113; a focus adjustment mechanism 115 that adjusts the focus of the optical system; a printed aboard for source light 118, having a light reception bore 116 arranged in a predetermined location with the light axes corresponding to the optical system 114, and materials for illuminating light source 117, such as light emitting diodes; a resinous material 120, having straight-through bores for elimination 121 and 121, to which the light emitting diodes mounted on the printed board are to be inserted and light reception bore 116 and a hand piece 112 of the hand-help type, having been built-in resinous material 120 and a thin sheet-like mirror unit 130 attached thereto.

The resinous material 120 is tightly attached to the printed board for source light 118 arranged inside the hand piece, and is put from the cylindrical tip of the hand piece 112. And in FIG. 13, 129 indicates a prism angle maintaining screw that tightens up the support bar 132 of the thin sheet-like mirror unit 130, and arrows L1 and L2 indicate illuminating light and received light, respectively. Additionally, this resinous material 120, straight-through bores 121 and 121 and reception light bore 116 arranged in the resinous material, and illuminating light source 117 that is the source of the illuminating light constitute a means for light emission and reception.

The thin sheet-like mirror unit 130 has the same construction as those of the thin sheet-like mirror unit in the above-mentioned first and second embodiments, wherein the support bar 132 having the thin sheet-like mirror 131 can be slid in and attached to a cut-out groove of the resinous material 120, whereby the thin sheet-like mirror unit 130 is detachable, thus providing the ability of replacement.

The above-mentioned thin sheet-like mirror 131 is formed so that its width becomes narrower towards the tip; that is, in a typical case, its side surface is formed as a convergent taper surface 131a from its base surface 131c, and the surface of the tip is formed as a mirror surface 131b having a gradient of an acute angle, for example, 45 degrees. And the illuminating light source 117 is arranged by both ends of the base surface 131c of the thin sheet-like mirror 131.

Figure 14:
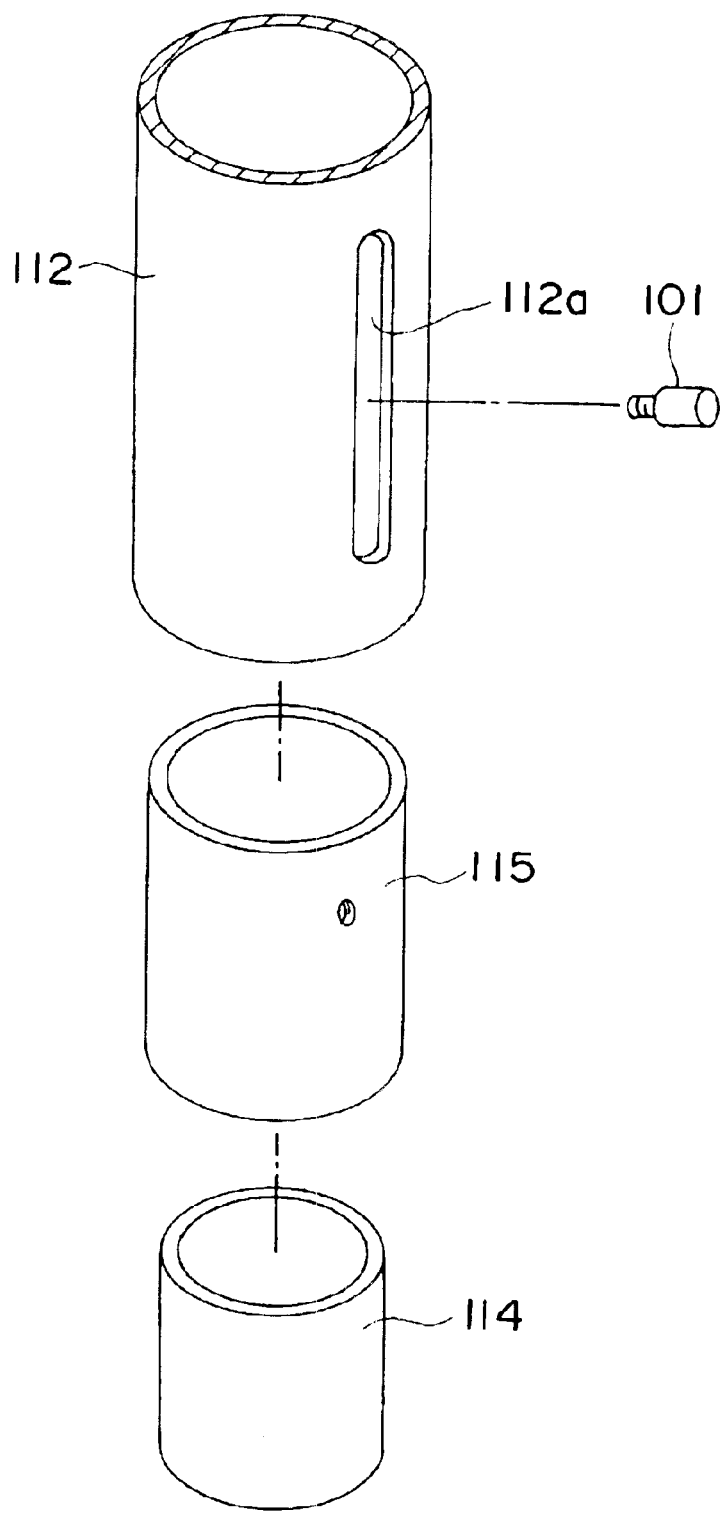
FIG. 14 is a disassembled perspective view showing an example of the focus adjustment mechanism of the microscope of the present invention.

As for the focus adjustment mechanism 115 that adjusts the focus of the optical system 114 is, as shown in FIG. 14, attached to the optical system 114, by, for example, attaching the pin or thumbscrew 101 piercing through the slit 112a arranged in the hand piece 112 to the optical system 114, and by vertically moving the pin or thumbscrew 101 along the slit 112a, the focus can be arranged appropriately.

Figure 15:
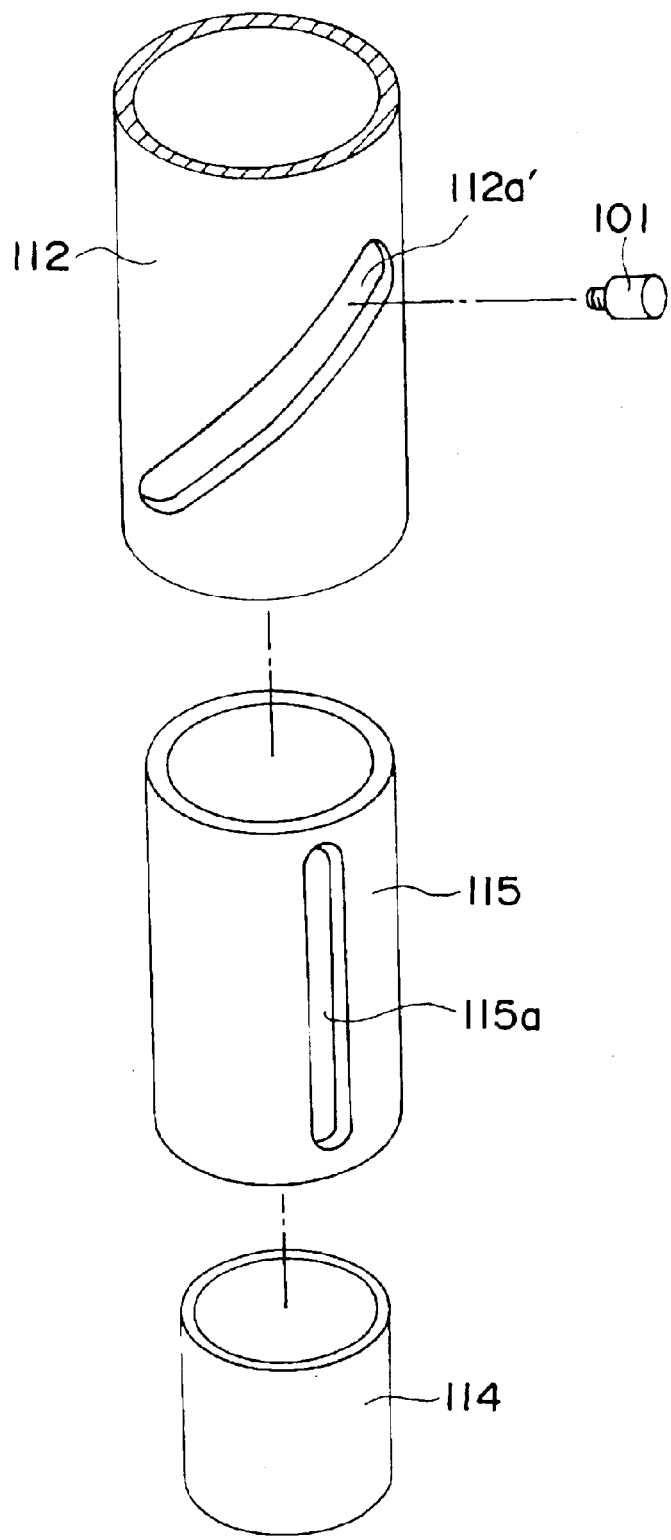
FIG. 15 is a disassembled perspective view of showing another example of the focus adjustment mechanism of the microscope of the present invention.

Alternatively, as shown in FIG. 15, by forming the slit 112a' that is slanted and curved on the hand piece 112, and a vertical slit 115a in the focus adjustment mechanism 115, the pin or thumbscrew 101 may be inserted to these slits 112a' and 115 to be attached to the optical system 114, and by vertically moving the pin or thumbscrew 101 along the slit 112a' and 115a to rotate and move the optical system 114, the focus may be adjusted.

Incidentally, the said focus adjustment mechanism is certainly applicable to the above-mentioned first and second embodiments of the microscope, as well.

According to this charge-coupled device-type video microscope, by incorporating a compact charge-coupled device camera into the microscope, and making a connection to a monitor, video images can be obtained, and since the illuminating light source 117 is also incorporated, bright and clear images of the target object can be observed.

Next, effects and usage of the first through third embodiments will be illustrated.

Figure 16:
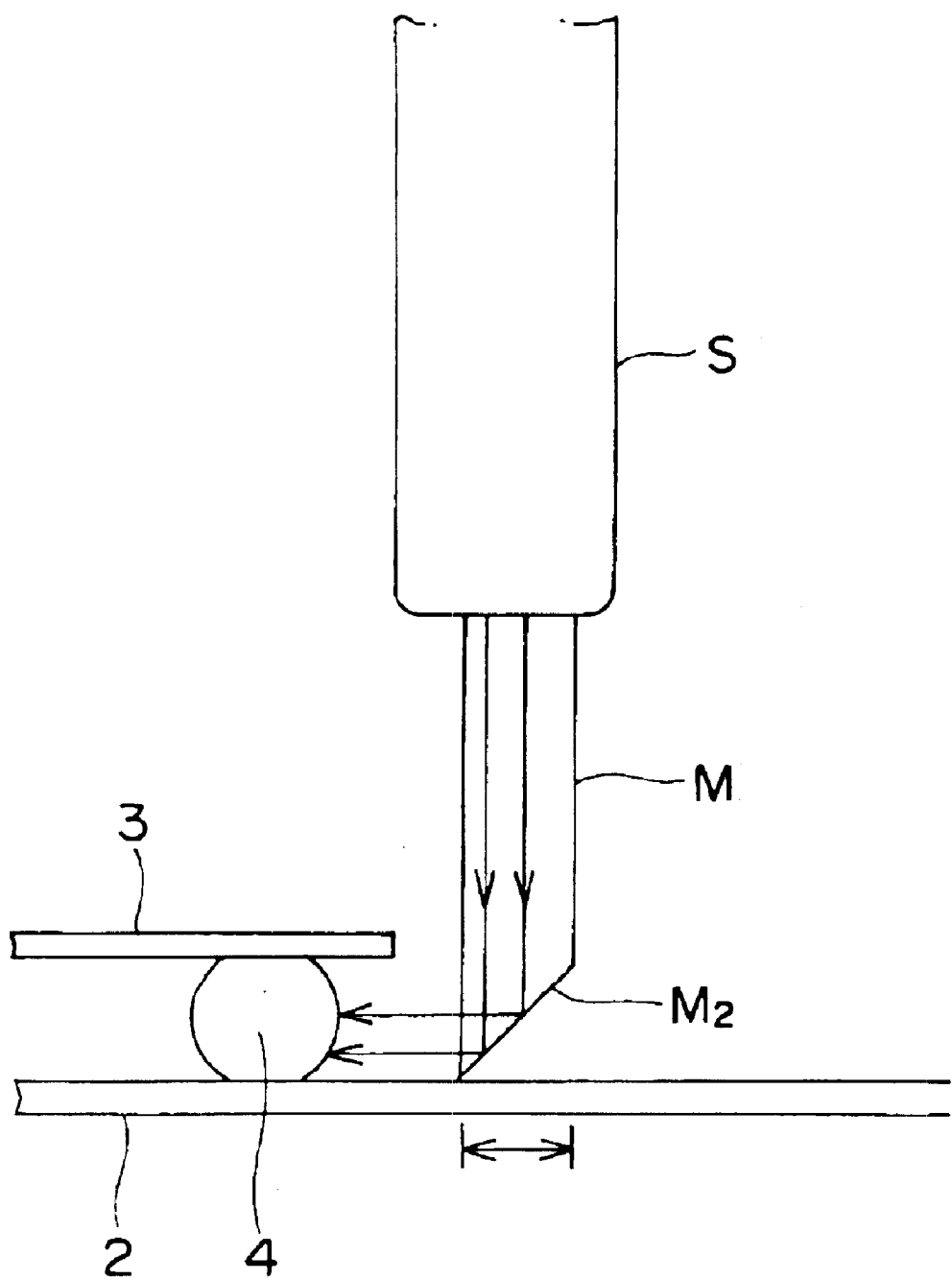
FIG. 16 is a schematic diagram showing a usage means of the microscope of the present invention.

FIG. 16 is a schematic diagram showing a usage means of the microscope S of the present invention.

For example, when examining the soldering conditions of the soldering ball 4 of the BGA 3, as shown in FIG. 16, the thin sheet-like mirror M of the microscope S needs to be set upright on the board 2, and illuminating light needs to be cast. In this case, since the thin sheet-like mirror M has a mirror surface M2 at an acute angle, and since the illuminating light is cast while the thin sheet-like mirror M is in a upright position, the light can illuminate the overall region down to the base of the soldering ball 4 of the dimension as small as some hundred microns.

Additionally, since the light is the diffused light that the thin sheet-like mirror has navigated through, the image light from the soldering ball 4 is flare-free, which provides clear images.

Figure 17:
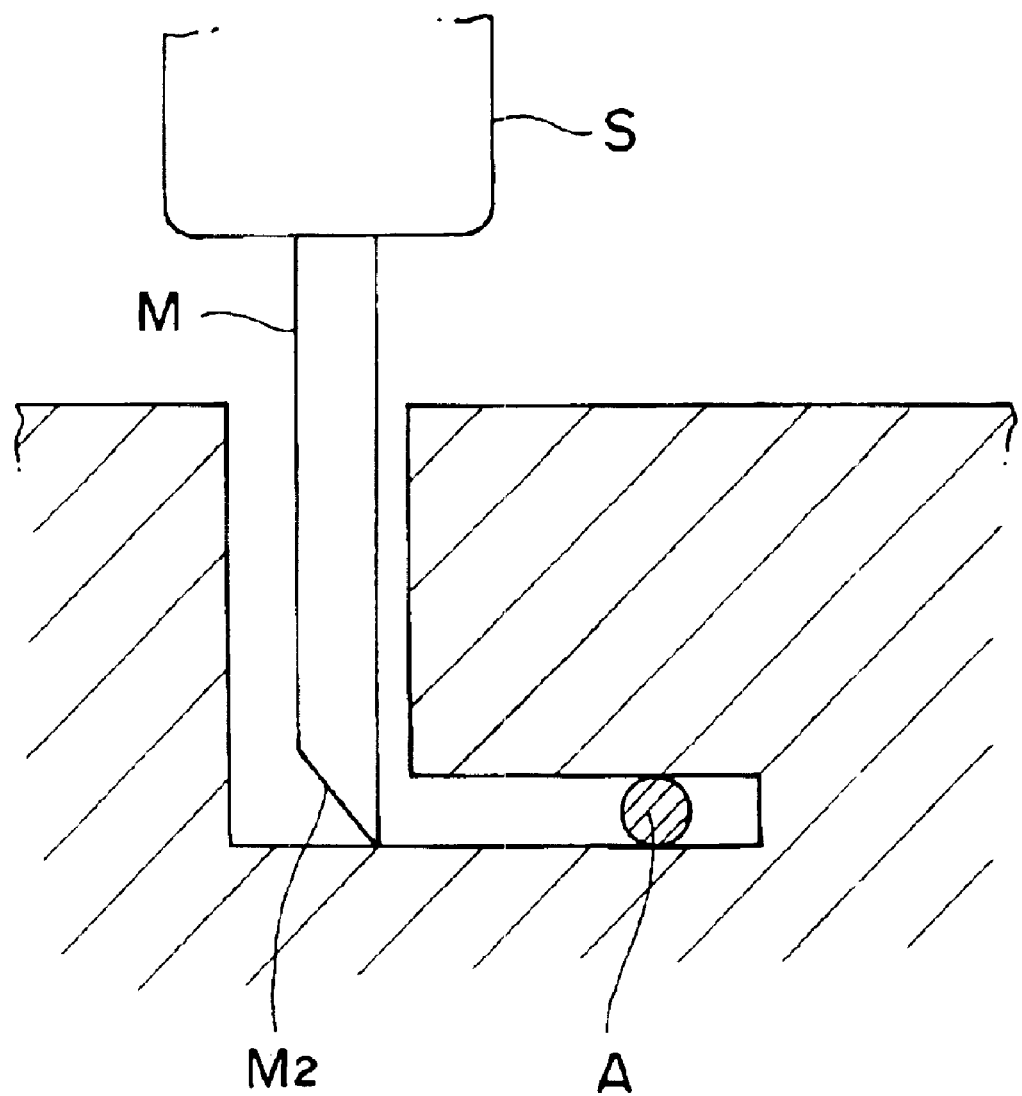
FIG. 17 is a drawing showing a usage example where the microscope is applied to a hole-shaped examination object.

Moreover, as shown in FIG. 17, since the thin sheet-like mirror M itself is compact and can examine in an upright position, a target object A that is located in an extremely narrow position can be examined.

Figure 18:
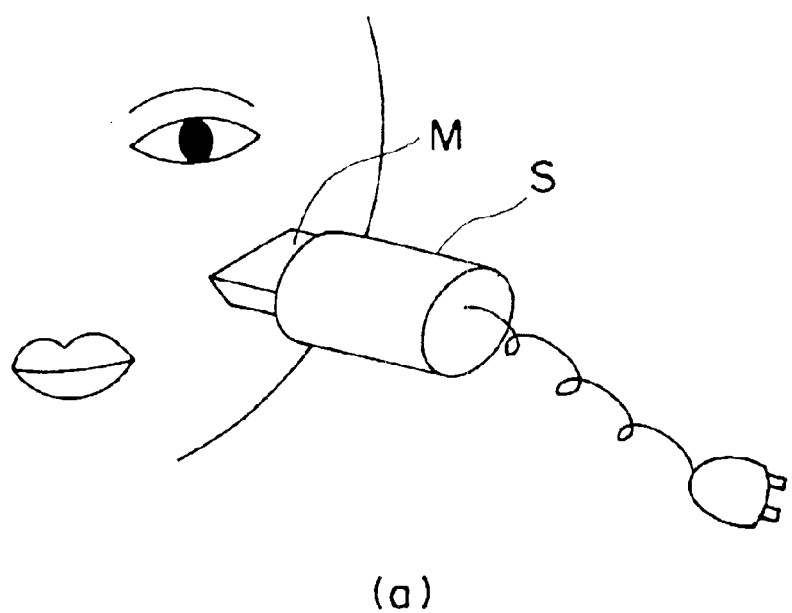
FIG. 18 includes a schematic diagram showing an application means of a microscope of the present invention: (a) is an example when examining the human skin; and (b) is a schematic diagram showing the examination means.
Figure 18:
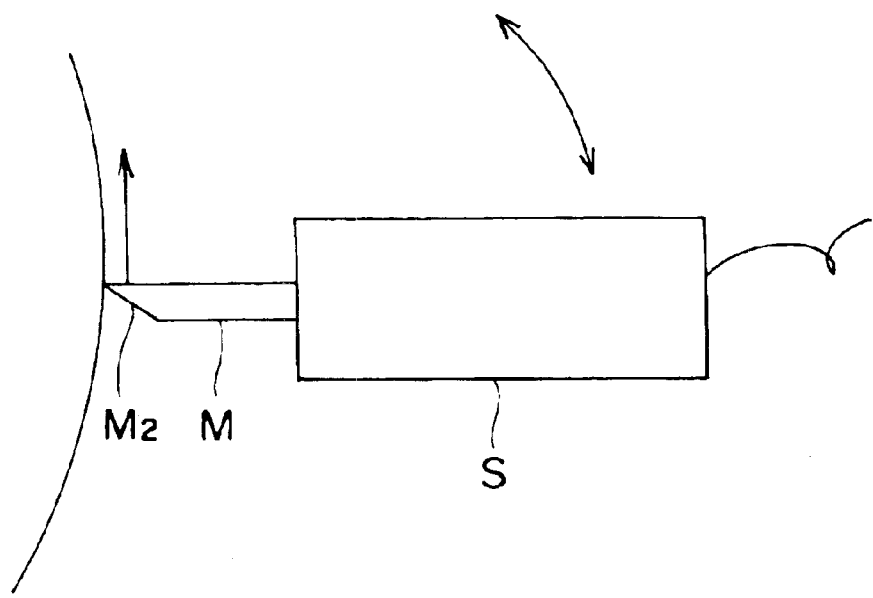

In addition, as shown in FIGS. 18(*a*) and (*b*), the conventional video microscopes have to be set in a slanted position when examining the human skin, crista cutis, and sebaceous gland; instead, the microscope S of the present invention allows particularly the charge-coupled device-type video microscope to examine in an upright position, slanted images can be easily observed.

Moreover, as shown by an arrow in FIG. 18(*b*), by slanting the charge-coupled device-type video microscope S of the present invention, various parts can be easily observed.

Figure 19:
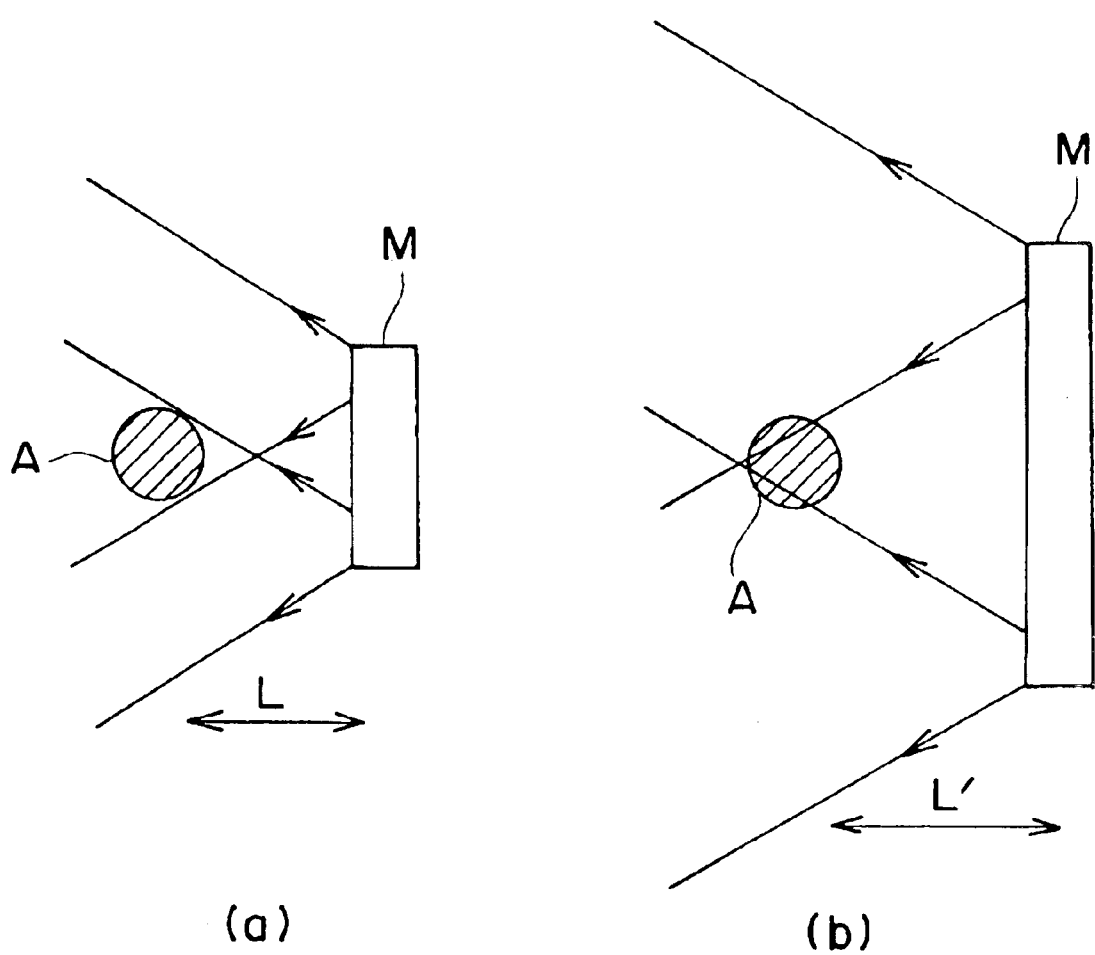
FIG. 19(a) is a topside view, showing effects of the convergent (taper-like) thin sheet-like mirror of the microscope of the present invention, whilst (b) is a topside view showing effects of a comparison example.

Furthermore, according to the present invention, since the taper surface M1 is formed so that the width of the thin sheet-like mirror M becomes narrower towards the tip, and at the tip is formed a mirror surface M2 at an acute angle, as shown in FIG. 19(*a*), the microscope can be set immediately in front of the target object A in a point-blank range. By so doing, the distance L between the exit of the illuminating light and the target object A can be shortened, and as a result, without less or no loss in the light volume, the entire target object A can be illuminated from the front side extremely efficiently with maintaining high intensity of illumination.

Incidentally, FIG. 19(*b*), as a comparison example, shows an arrangement relationship between a non-convergent (straight-shaped) sheet-like mirror M' and the target object A. The distance L' between the exit of the illuminating light and the target object A is longer than the distance L.

Figure 20:
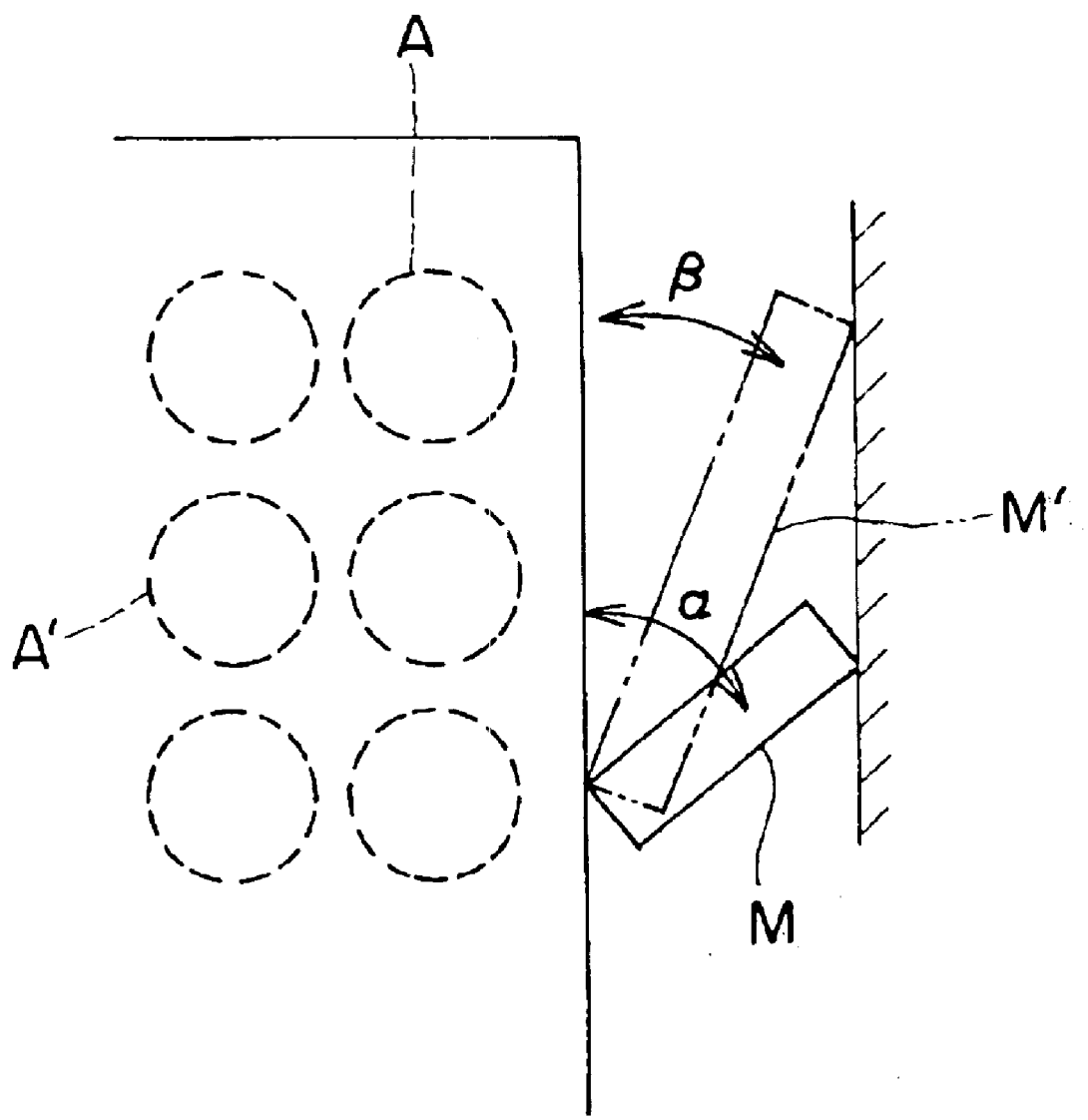
FIG. 20 is a topside view, which shows comparison between the effects of the convergent (taper-like) thin sheet-like mirror of the present invention, and those of the conventional ones.

And as shown in FIG. 20, even when making an observation with spatial limitations, it is possible to keep the angle α large, to which the mirror can be slanted from the target object A (for example, BGA and soldering parts of CSP, etc.). In other words, the target object A can be observed from various angular stances, so, freedom of observation angles will be greatly improved. By so doing, observations with the target object A' brought into focus is possible even it is, for example, in a secluded location. Additionally, in the case of the sheet-like mirror M' as above-mentioned comparison example in considering the same, the large width poses limitations to the angle β, to which it can take from the target object A. For this reason, observations with the target object A' brought into focus cannot be made since it is in a secluded location.

Moreover, the illustration thus far has been made with the thin sheet-like mirror N and its support construction being integrated as a unit with the support bar and the mirror; however, forming a slitting, etc. at the tip of the hand piece, it is possible to insert the thin sheet-like mirror M directly to the slitting, certainly as well.

Figure 21:
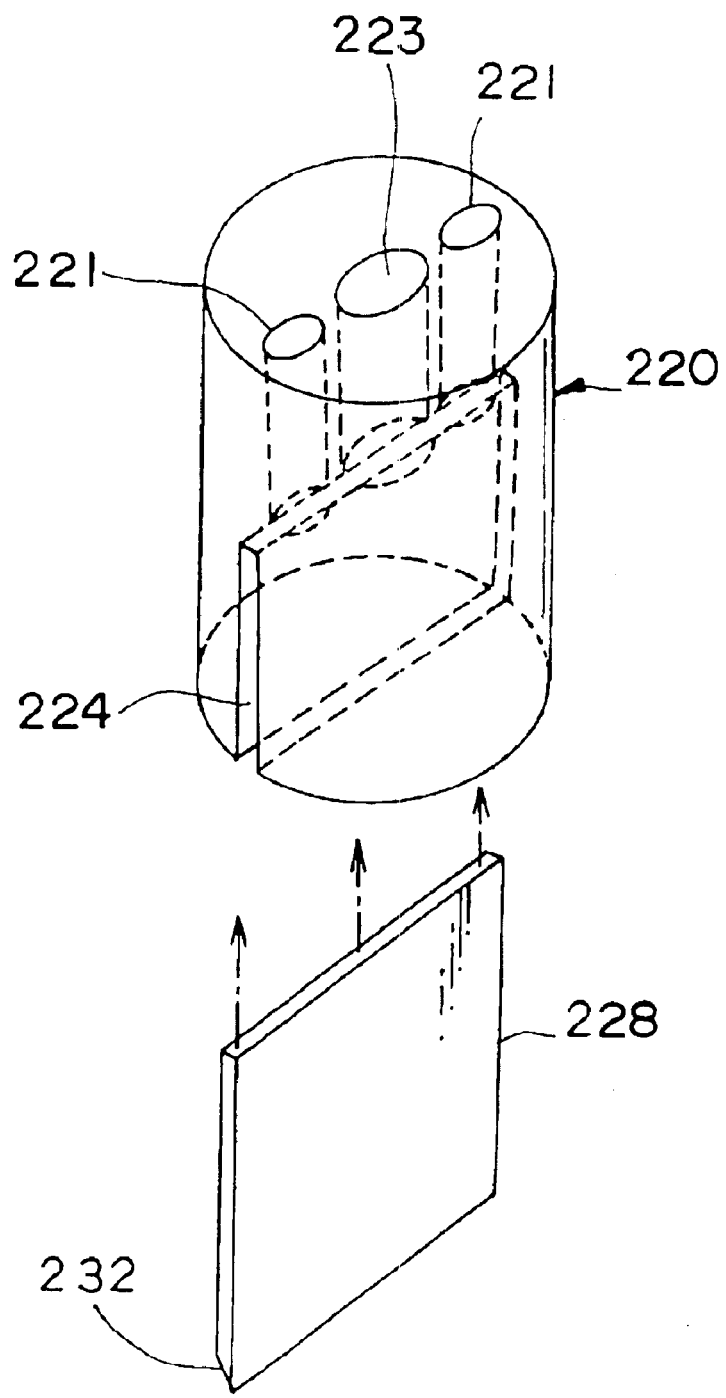
FIG. 21 is a schematic drawing of the thin sheet-like mirror of a microscope of the present invention, and a resinous material that is used for the attachment purpose.

Furthermore, in the illustrations above, the construction of the sheet-like mirror of the microscope pertinent to the present invention has been exemplified with those where the width of the sheet-like mirror is formed to become narrower towards the tip; as shown in FIG. 21, however, it is certainly possible to form the widths of the base side and of the tip of the sheet-like mirror being effectively equal to each other, i.e., to form a rectangular shape, as well. The point here is to select a shape and dimension of the sheet-like mirror in accordance with the size of the region of observation when observing a target object.

As shown in FIG. 21, the rectangular sheet-like mirror 228 is attached to the resinous material 220. This resinous material 220 has a slitting 224 that is cut out to a predetermined depth, of which width is approximately equal to the width of the sheet-like mirror 228, wherein the light reception bore 223 for image light arranged around the center axis of the cylindrical member, and the straight-through bores 221 and 221 for the illumination purpose arranged in the locations symmetrical to each other with respect to the center axis pierce through the slitting 224. This slitting 224 has, as FIG. 21 indicates, the base side of the sheet-like mirror 228 inserted to the extent that it is tightly attached to the straight-through bores 221 and 221, and light reception bore 223, and it encloses the straight-through bores 221 and 221, and light reception 223. The mirror surface 232 at the tip of the rectangular sheet-like mirror 228 is slanted to 45 degrees.

Since the straight-through bore 221 for the illumination purpose and the straight-through bore 223 for image light are individually separated right in front of the thus inserted sheet-like mirror 228, astray light, if any, never gets into the straight-through bore 223 for image light, and light will be condensed through the navigation of the sheet-like mirror 228, which provides flare-free clear images.

Figure 22:
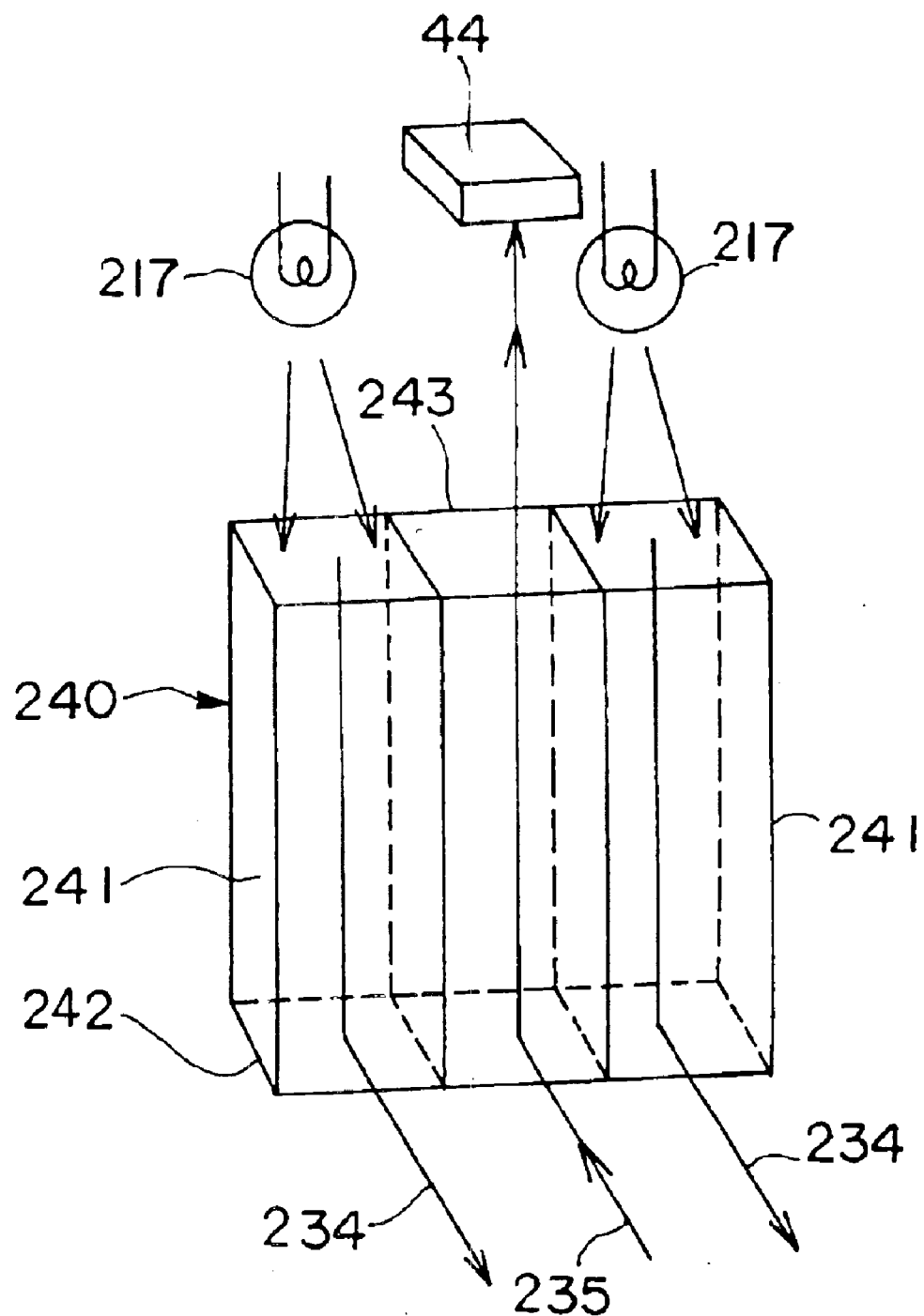
FIG. 22 is a schematic drawing of a rectangular-sheet like mirror of the separate type.

FIG. 22 is an example of using a separate-type rectangular sheet-like mirror.

The first sheet-like mirror 240 is comprised of illuminating light navigation mirrors 241 and 241, and image light navigation mirror 243, and upon combining these three navigation mirrors, they will be inserted to and bound between the above-mentioned resinous material 220, or the slitting. Other constructions are the same as those in the sheet-like mirror 228 described above, the mirror surface 242 is slanted to 45 degrees. Incidentally, the illuminating light navigation mirrors 241 and image light navigation mirror 243 may be independent of one another, and they may be overlapped and combined when in use; however, putting them adhesively all together as a unit may be possible, as well. In the case of this first sheet-like mirror 240, routes, which illuminating light 234 and 234, and image light 235 pass through, are independent of one another, no interference among them is conceivable. In the drawing, 217 indicates illuminating light source, and 244 a compact charge-coupled device.

And instead of using two illuminating light navigation mirrors 241 and 241, a single illuminating light navigation mirror 241 will certainly suffice.

In the cases such as this separate-type rectangular sheet-like mirror, it is possible to prepare illuminating light navigation mirrors and image light navigation mirrors, having various mirror angles; therefore, once appropriate choices are made, it will allow the target object to be well illuminated.

Figure 23:
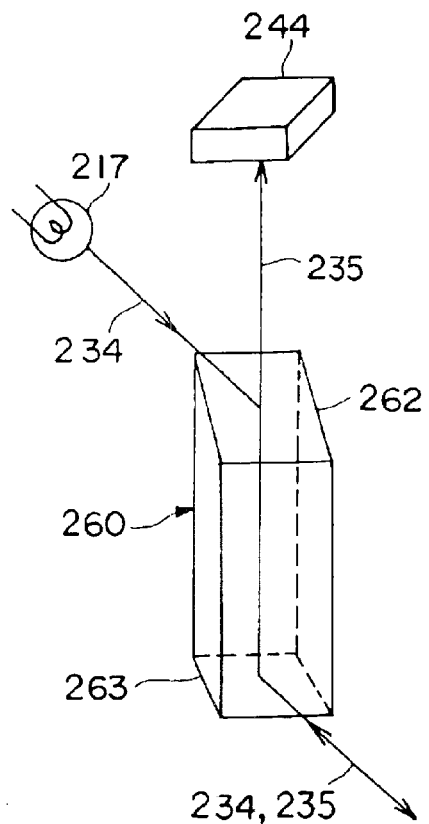
FIG. 23 includes a drawing another rectangular sheet-like mirror: (a) is a schematic drawing of a sheet-like mirror; and (b) is a schematic diagram.
Figure 23:
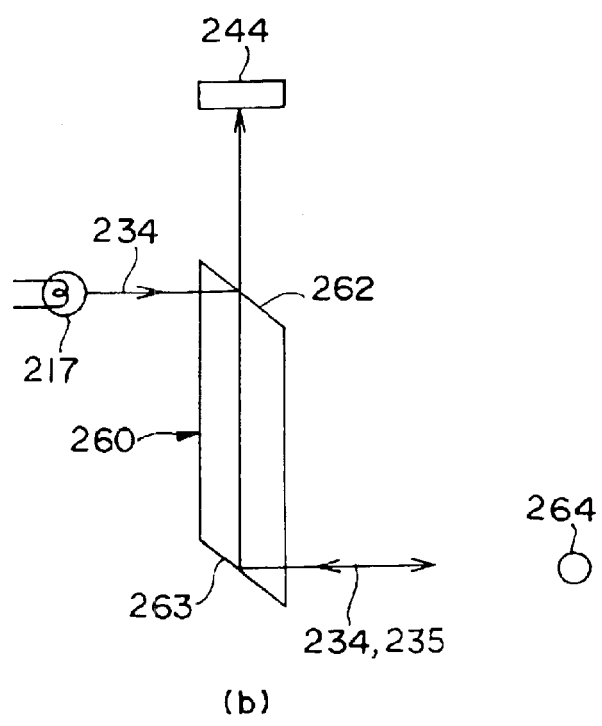
Figure 24:
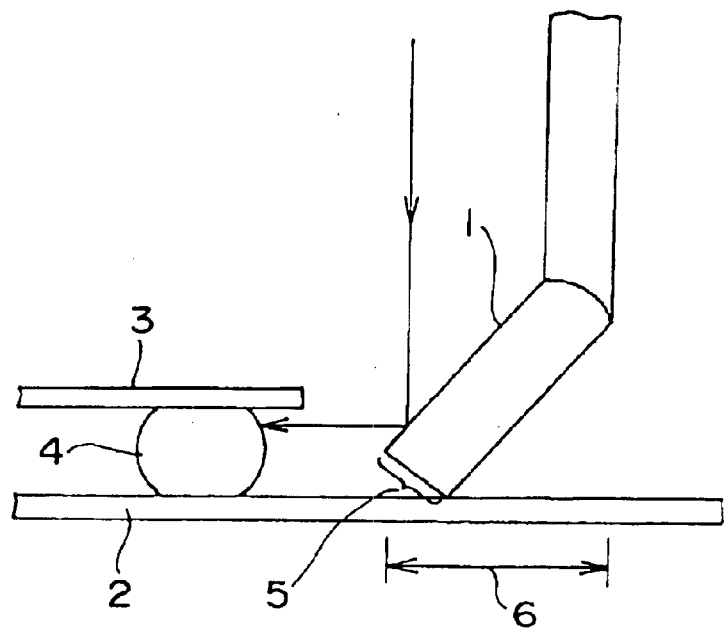
FIG. 24 includes schematic diagrams showing conventional examples when BGA soldering conditions are observed: (a) is an observation example by a mirror; and (b) is an observation example by a prism.
Figure 24:
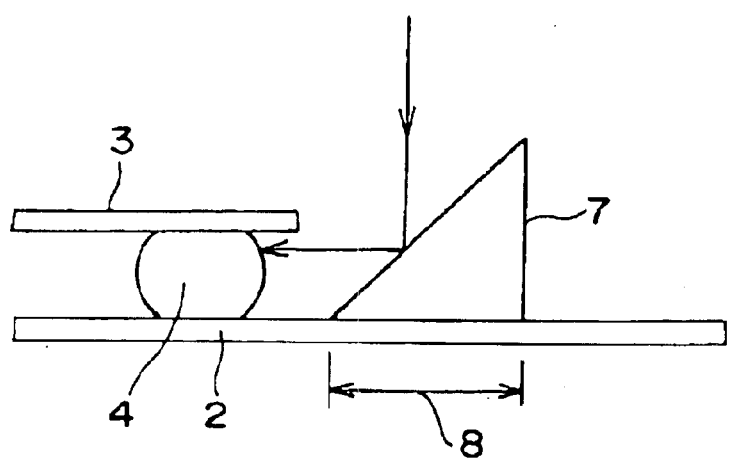

As another example, as shown in FIG. 23(a), the sheet-like mirror 260 may be comprised of: a mirror surface 263, which illuminating light and image light go back and forth, and has a gradient of 45 degrees at the tip; and a half mirror 262, which illuminating light 234 comes in, and image light 235 irradiates light from, and whose base surface is cut to 45 degrees. In this case, as shown in FIG. 23(b), illuminating light 234 irradiated from the illuminating light source 217 goes into the sheet-like mirror 260, and gets reflected at the half mirror 262 at the base surface, wherein the sheet-like mirror navigates the illuminating light toward the mirror surface 263, and it gets reflected again and irradiated. The illuminating light 234 gets reflected at the object 264, generating image light 235, which goes into the sheet-like mirror 260 and gets reflected at the mirror surface 263. The sheet-like mirror navigates the image light, which irradiates light at the half mirror 262, and reaches a compact charge-coupled device 244, generating video images. In this sheet-like mirror 260, illuminating light and image light basically use the same route.

The present invention can be constructed as a charge-coupled device-type video microscope to obtain video images by incorporating a compact charge-coupled device camera; yet, it is certainly possible to use as a handy microscope to directly observe a target object without incorporating a charge-coupled device camera.

Specific numeral examples, application fields, etc. that have been illustrated in the above embodiments are not limitative to the scope of the present invention, but various changes and applications can be made therein and thereto. Moreover, in regards to the disclosed embodiments, it is understood by those skilled in the art that the foregoing and various other changes, omissions and additions may be made therein and thereto, without departing from the spirit and scope of the present invention. Therefore, the present invention should not be understood as limited to the specific embodiments, which can be embodies within a scope encompassed and equivalents thereof with respect to the feature set out in the appended claims.

INDUSTRIAL APPLICABILITY

As understood from the illustrations in the above, either a charge-coupled device-type video microscope or a handy microscope without making a connection to a video, in the present invention, can serve as a less expensive microscope, which can provide a wider horizon, and with which horizontal observations are possible in an extremely narrow space. And in particular, according to the present invention, a mirror surface can be formed to be compact, so a target object can be placed immediately in front in a point-blank range, whereby the distance between the exit of the illuminating light and the target object can be shortened, and as a result, without less or no loss in the light volume, the entire target object can be illuminated from the front side extremely efficiently with maintaining high intensity of illumination.

What is claimed is:

1. A microscope comprised of:
   a means of light emission and reception, comprised of a straight-through bore having a built-in source of illuminating light, and a light reception bore for image light separately;
   a rectangular thin sheet-like mirror, arranged in a closed and adjacent manner with the straight-through bore and the light reception bore of the means of light emission and reception, wherein a mirror surface is formed at an acute angle at the tip thereof,
   said thin sheet-like mirror navigates illuminating light so as to reflect at said mirror surface, and irradiate the light and a thus reflected and returned image light can be navigated and condensed by making a reflection at said mirror surface,
   wherein said light reception bore for the image and the straight-through bore are aligned in a row in a horizontal direction perpendicular to the depth of the thin sheet-like mirror.

2. A microscope comprised of:
   a means of light emission and reception, comprised of a straight-through bore having a built-in source of illuminating light, and a light reception bore for image light separately; and a rectangular thin sheet-like mirror, arranged in a closed and adjacent manner with the straight-through bore and the light reception bore of is said means of light emission and reception, wherein a mirror surface is formed at an acute angle at the tip thereof,
   said thin sheet-like mirror is composed of said thin sheet-like mirrors formed separately and binded each other in accordance with We said straight-through bore and the light reception bore,
   said thin sheet-like mirror navigates illuminating light so as to reflect at said mirror surface and irradiate the light, and a thus reflected and returned image light can be navigated and condensed by making a reflection at said mirror surface,
   wherein said light reception bore for the image and the straight-through bore are aligned in a row in a horizontal direction perpendicular to the depth of the thin sheet-like mirror.

3. A microscope comprised of: a means of light emission and reception, comprised of a straight-through bore having a built-in source of illuminating light, and a light reception bore for image light separately; and a rectangular thin sheet-like mirror, arranged in a closed and adjacent manner with the straight-through bore and the light reception bore of the means of light emission and reception, wherein a mirror surface is formed at an acute angle at the tip thereof,
   said rectangular thin sheet-like mirror has a half mirror at a base side surface, which takes in said illuminating light and irradiates said image light,
   said rectangular thin sheet-like mirror reflects the illuminating light at said half mirror, navigates, and reflects at said mirror surface to irradiate the light; a thus reflected and returned image light can be reflected at said mirror surface, and navigated to get the light condensed,
   wherein said light reception bore for the image and the straight-through bore are aligned in a row in a horizontal direction perpendicular to the depth of the thin sheet-like mirror.

4. A microscope comprised of: a means of light emission and reception for illuminating light and image light comprised of a straight-through bore having a built-in source of illuminating light, and a light reception bore for image light separately;

a rectangular thin sheet-like mirror arranged in the means of light emission and reception; and a mirror surface formed at the tip of the thin sheet-like mirror at an acute angle, wherein said mirror is the separate type in accordance with the means of light emission and reception, wherein said light reception bore for the image and the straight-through bore are aligned in a row in a horizontal direction perpendicular to the depth of the rectangular thin sheet-like mirror.

5. A microscope as claimed in any of claims 1, 3, or 4, further characterized in that the rectangular thin sheet-like mirror is detachable from a hand piece.

6. The microscope as recited in claims 1, 3, or 4, wherein the sheet-like mirror has a dimension that correspondences to a size of a region of observation of a target object.

* * * * *